US011508064B2

(12) United States Patent
Sakai et al.

(10) Patent No.: US 11,508,064 B2
(45) Date of Patent: Nov. 22, 2022

(54) COMPUTER-READABLE RECORDING MEDIUM HAVING STORED THEREIN INFORMATION PROCESSING PROGRAM, METHOD FOR PROCESSING INFORMATION, AND INFORMATION PROCESSING APPARATUS

(71) Applicants: FUJITSU LIMITED, Kawasaki (JP); RIKEN, Wako (JP); NATIONAL CANCER CENTER, Tokyo (JP)

(72) Inventors: Akira Sakai, Kawasaki (JP); Masaaki Komatsu, Wako (JP); Ai Dozen, Chuo (JP)

(73) Assignees: FUJITSU LIMITED, Kawasaki (JP); RIKEN, Wako (JP); NATIONAL CANCER CENTER, Tokyo (JP)

( * ) Notice: Subject to any disclaimer, the term of this patent is extended or adjusted under 35 U.S.C. 154(b) by 162 days.

(21) Appl. No.: 17/144,162

(22) Filed: Jan. 8, 2021

(65) Prior Publication Data
US 2021/0241452 A1 Aug. 5, 2021

(30) Foreign Application Priority Data
Jan. 30, 2020 (JP) .............................. JP2020-014107

(51) Int. Cl.
G06T 7/11 (2017.01)
G06T 7/00 (2017.01)
(Continued)

(52) U.S. Cl.
CPC .......... *G06T 7/0012* (2013.01); *G06K 9/6256* (2013.01); *G06N 3/08* (2013.01);
(Continued)

(58) Field of Classification Search
CPC ................... G06K 9/6256; G06N 3/08; G06T 2207/10132; G06T 2207/20081;
(Continued)

(56) References Cited

U.S. PATENT DOCUMENTS 11,334,759 B2 * 5/2022 Saruta ..................... G06K 9/628
2008/0164985 A1 * 7/2008 Iketani .................... G01S 17/86
340/435
(Continued)

OTHER PUBLICATIONS

Extended European Search Report dated Jun. 14, 2021 in European Application No. 21150700.9.
(Continued)

*Primary Examiner* — Tsung Yin Tsai
(74) *Attorney, Agent, or Firm* — Xsensus LLP

(57) ABSTRACT

A method includes: acquiring a training data set including pieces of training data, each of the pieces including an image of a training target, first annotation data representing a rectangular region in the image, and second annotation data; training, based on the image and the first annotation data, an object detection model specifying a rectangular region including the training target; training, based on the image and the second annotation data, a neural network; and calculating a first index value related to a relationship of a pixel number, the trained estimation model and the calculated first index value being used in a determination process that determines, based on the calculated first index value and a second index value relationship between a pixel number in an output result and an estimation result, whether or not a target in a target image is normal.

18 Claims, 20 Drawing Sheets

(51) Int. Cl.
  *G06K 9/62* (2022.01)
  *G06N 3/08* (2006.01)
(52) U.S. Cl.
  CPC ...... *G06T 7/11* (2017.01); *G06T 2207/10132* (2013.01); *G06T 2207/20081* (2013.01); *G06T 2207/20084* (2013.01); *G06T 2207/30044* (2013.01); *G06T 2207/30048* (2013.01); *G06V 2201/031* (2022.01)
(58) Field of Classification Search
  CPC . G06T 2207/20084; G06T 2207/30044; G06T 2207/30048; G06T 7/0012; G06T 7/11; G06V 10/454; G06V 10/764; G06V 10/82; G06V 2201/031
  See application file for complete search history.

(56) References Cited

U.S. PATENT DOCUMENTS

| | | | | |
|---|---|---|---|---|
| 2016/0358338 | A1* | 12/2016 | Tsunoda | G06V 10/7625 |
| 2017/0109625 | A1* | 4/2017 | Dai | G06K 9/6273 |
| 2017/0206431 | A1* | 7/2017 | Sun | G06V 10/454 |
| 2019/0057507 | A1* | 2/2019 | El-Khamy | G06T 5/20 |
| 2020/0111204 | A1* | 4/2020 | Cosatto | G06N 3/088 |
| 2020/0250471 | A1* | 8/2020 | Saruta | G06V 10/764 |
| 2021/0224997 | A1* | 7/2021 | Kushida | A61B 3/0025 |

OTHER PUBLICATIONS

Teresa Araujo et al., "UOLO—automatic object detection and segmentation in biomedical images", Arxiv.Org, Cornell University Library, Oct. 9, 2018, XP081357608.

Ihsan Ullah et al., "Real-Time Tracking of Guidewire Robot Tips Using Deep Convolutional Neural Networks on Successive Localized Frames", IEEE Access, vol. 7, Oct. 29, 2019, pp. 159743-159753, XP011754182.

Paul F. Jaeger et al., "Retina U-Net: Embarrassingly Simple Exploitation of Segmentation Supervision for Medical Object Detection", Arxiv.Org, Cornell University Library, Nov. 21, 2018, XP080937447.

Shengfeng Liu et al., "Deep Learning in Medical Ultrasound Analysis: A Review", Engineering, vol. 5, No. 2, Jan. 29, 2019, pp. 261-275, XP055653134.

Simon Hawkins et al., "Outlier Detection Using Replicator Neural Networks", Data Warehousing and Knowledge Discovery: 4th International Conference, Sep. 2, 2002, 10 pages.

* cited by examiner

FIG.3 EXAMPLE OF NORMAL NAIL AND ABNORMAL NAIL ARRANGED AT DIFFERENT POSITIONS ON DIFFERENT BACKGROUNDS

EXAMPLE OF SECTIONAL VIEW OF NORMAL THORAX OF ULTRASONOGRAPHIC IMAGE

EXAMPLE OF SECTIONAL VIEW OF ABNORMAL THORAX
OF ULTRASONOGRAPHIC IMAGE

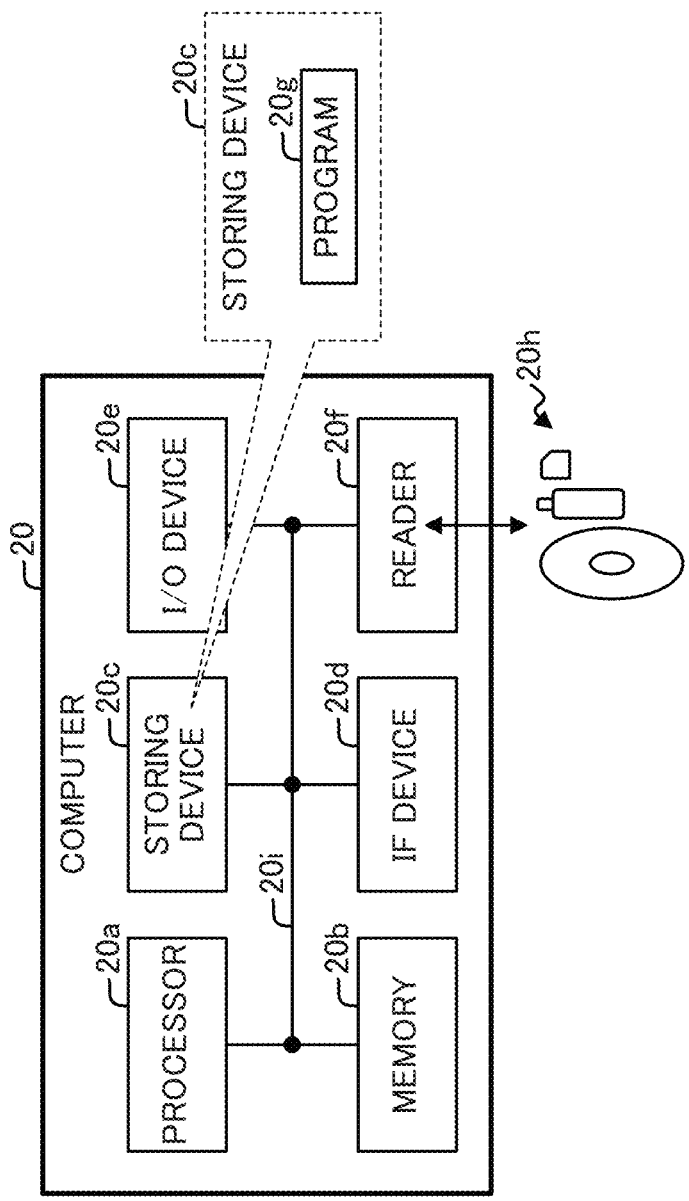

COMPUTER-READABLE RECORDING MEDIUM HAVING STORED THEREIN INFORMATION PROCESSING PROGRAM, METHOD FOR PROCESSING INFORMATION, AND INFORMATION PROCESSING APPARATUS

CROSS-REFERENCE TO RELATED APPLICATION

This application is based upon and claims the benefit of priority of the prior Japanese Patent application No. 2020-014107, filed on Jan. 30, 2020, the entire contents of which are incorporated herein by reference.

FIELD

The embodiments discussed herein relates to a computer-readable recording medium having stored therein an information processing program, a method for processing information, and an information processing apparatus.

BACKGROUND

As a scheme for detecting abnormality of a target included in an input image, a scheme for detecting abnormality with an auto-encoder has been known.

In a scheme for detecting abnormality with an auto-encoder, the auto-encoder is trained, using normal data in which a target is normal as an input, so as to reconstruct the normal data and output the decoded the normal data.

Since, even if abnormal data in which the target is abnormal is input, a trained auto-encoder decodes the abnormal data to normal data, the difference between the input-data and the output-data in this case is larger than that of cases where normal data is input.

For its ability of detecting abnormality of a target on the basis of a deviation of abnormal data from the normal data as a result of training that uses only the normal data among the normal and abnormal data, the scheme for detecting abnormality using an auto-encoder is highly versatile.

[Non-Patent Document 1] Simon Hawkins et al., "Outlier Detection Using Replicator Neural Networks", "Data Warehousing and Knowledge Discovery: 4th International Conference", Sep. 2, 2002

In the meantime, such a scheme for detecting abnormality using an auto-encoder sometimes has a difficulty in discriminating the background and noise included in the normal data from abnormality, and therefore is sometimes vulnerable to change of the background and noise.

For the above, when the above scheme for detecting abnormality in the target is applied to abnormality detection of a target, which has variations in at least of the position and the background thereof, the precision in detecting abnormality may be lowered.

SUMMARY

According to an aspect of the embodiments, a non-transitory computer-readable recording medium having stored therein an information processing program that causes a computer to execute a process including: acquiring a training data set including a plurality of pieces of training data, each of the plurality pieces of training data including an image obtained by photographing a training target, first annotation data representing a rectangular region including the training target in the image, and second annotation data representing one or more pixels corresponding to the training target in the image; training, based on the image and the first annotation data included in the training data set, an object detection model included in an estimation model, the object detection model specifying a rectangular region including the training target in the image in response to inputting of the image; training, based on the image and the second annotation data included in the training data set, a neural network included in the estimation model, the neural network outputs one or more pixels estimated to correspond to the training target in the image in response to inputting of the image; and calculating a first index value related to a relationship of a pixel number between a pixel number of the rectangular region including the training target specified by the first annotation data and a pixel number corresponding to the training target specified by the second annotation data, the estimation model after the training and the calculated first index value being used in a determination process that determines, based on the calculated first index value and a second index value, whether or not a target that is to be determined and that is included in a target image is normal, the second index value being related to a relationship between a pixel number corresponding to a rectangular region specified by an estimation result obtained by using the trained object detection model in an output result and a pixel number corresponding to the target specified by an estimation result obtained by using the trained neural network, the output result being output from the estimation model after the training in response to inputting of the target image including the target.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 is a block diagram schematically illustrating an example of the hardware configuration of a computer of one embodiment.

DESCRIPTION OF EMBODIMENTS

Figure 1:
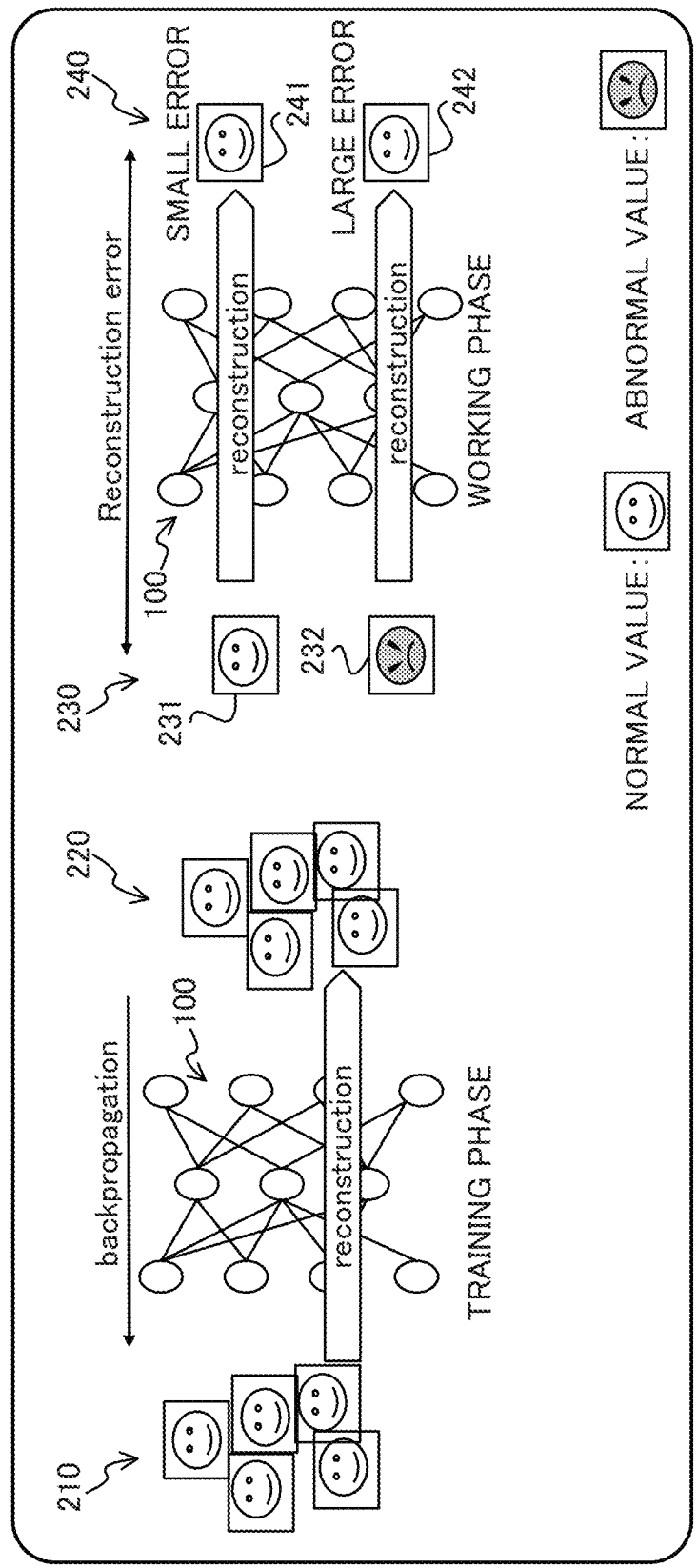
FIG. 1 is a diagram illustrating an abnormality detection process according to a first scheme of a comparative example.

Hereinafter, an embodiment of the present invention will now be described with reference to the accompanying drawings. However, one embodiment described below is merely illustrative and the present embodiment can be variously modified and implemented without departing from the scope thereof. In the drawings to be used in the following description, the same reference numbers denote the same or similar parts, unless otherwise specified.

(1) ONE EMBODIMENT (1-1) Comparative Example

Figure 2:
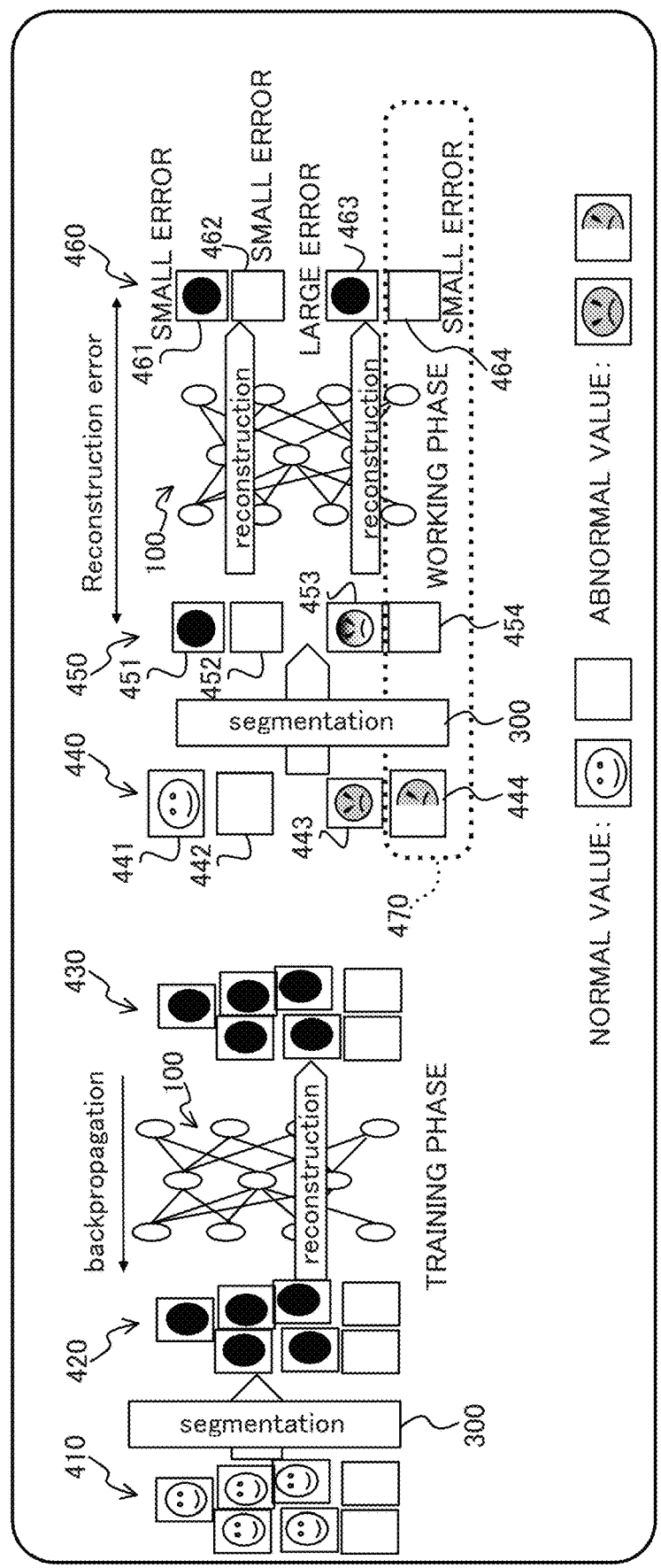
FIG. 2 is a diagram illustrating an abnormality detection process according to a second scheme of a comparative example.

First of all, description will now be made in relation to a comparative example to one embodiment. FIGS. 1 and 2 are each diagram illustrating an abnormal detection process of the comparative example.

As illustrated in FIG. 1, according to the first scheme of the comparative example, a server carries out unsupervised training by inputting an image 210 including a target into an auto-encoder 100 and instructing the auto-encoder 100 to output an image 220 obtained by reconstructing (decoding) the image 210 in a training phase.

In a working phase after the training phase, the sever compares an input image 230 with an output image 240 output from the auto-encoder 100 using the input image 230 as the input to obtain a difference between the input image 230 and the output image 240 and, if the difference is large, determines that the target included in the input image 230 is abnormal.

For example, since the difference between an input image 231 including a target having a normal value and an output image 241 based on the input image 231 is relatively small, the server determines that the target included in the input image 231 to be normal. On the other hand, since the difference between an input image 232 including a target having an abnormal value and an output image 242 based on the input image 232 is relatively large, the server determines that the target included in the input image 232 to be abnormal.

However, even if wishing to determine normality or abnormality of only the target included in the input mage 230, the first scheme of the comparative example has a possibility of detecting variation of the background and/or the position included in the image 230, i.e., noise, to be abnormal, which results in lowering the precision of detecting abnormality.

A second scheme illustrated in FIG. 2 is conceivable for an improvement to the first scheme, for example. As illustrated in FIG. 2, the second scheme of the comparative example detects a mask of an object (target) to be examined from an input image in a unit of pixel, using a trained neural network (NNW) 300 for segmentation which network is trained with normal data. Then the server determines whether or not the target, which is masked, is normal or abnormal by applying the first scheme to the mask of the object to be examined which mask is detected in a unit of pixel.

For example, the server obtains a mask image 420 being output from the NNW 300 that inputs an image 410 including the target and including a mask of the target in a training phase. Then the sever carries out unsupervised training on the auto-encoder 100 such that the auto-encoder 100 reconstructs the input mask image 420 and outputs an output mask image 430.

Further, in the working phase after the training phase, the sever compares the mask image 450 output from the NNW 300 using the image 440 as an input with an output mask image 460 output from the auto-encoder 100 using the mask image 450 as the input to obtain a difference.

For example, since the differences of mask images 451 and 452 including targets having normal values from respective corresponding output mask images 461 and 462 are relatively small, the server determines that the targets included in images 441 and 442 are normal. In contrast, since the difference of a mask image 453 including a target having an abnormal value from a corresponding output mask image 463 is relatively large, the server determines that the target included in an image 443 to be abnormal.

Here, in the second scheme of the comparative example, the NNW 300 for segmentation preferentially learns normal data having a larger data volume. Accordingly, in cases where an image 444 including an abnormal target is input as represented by a dot-line frame 470 illustrated in FIG. 2, a mask of a target is sometimes not output to a mask image 454 output from the NNW 300, which means the mask image 454 in which nothing appears may be output.

However, since the auto-encoder 100 may learn the image in which nothing appears to be normal, the difference between the mask image 454 and the output mask image 464 output from the trained auto-encoder 100 is sometimes relatively small. In this case, the server does not sometimes detect the abnormality like the target included in the image 444.

"Abnormality" of a target may mean that, for example, the target has a shape different from the original shape of the normal target to an extent that the trained NNW 300 fails to detect the target to be a segmentation target. For example, such an abnormal state is a state where the shape of a target is different from the shape of the normal target due to a loss of part of the target or deformation of at least part of the target, and is exemplified by a broken nail 510b illustrated in FIG. 3.

Figure 3:
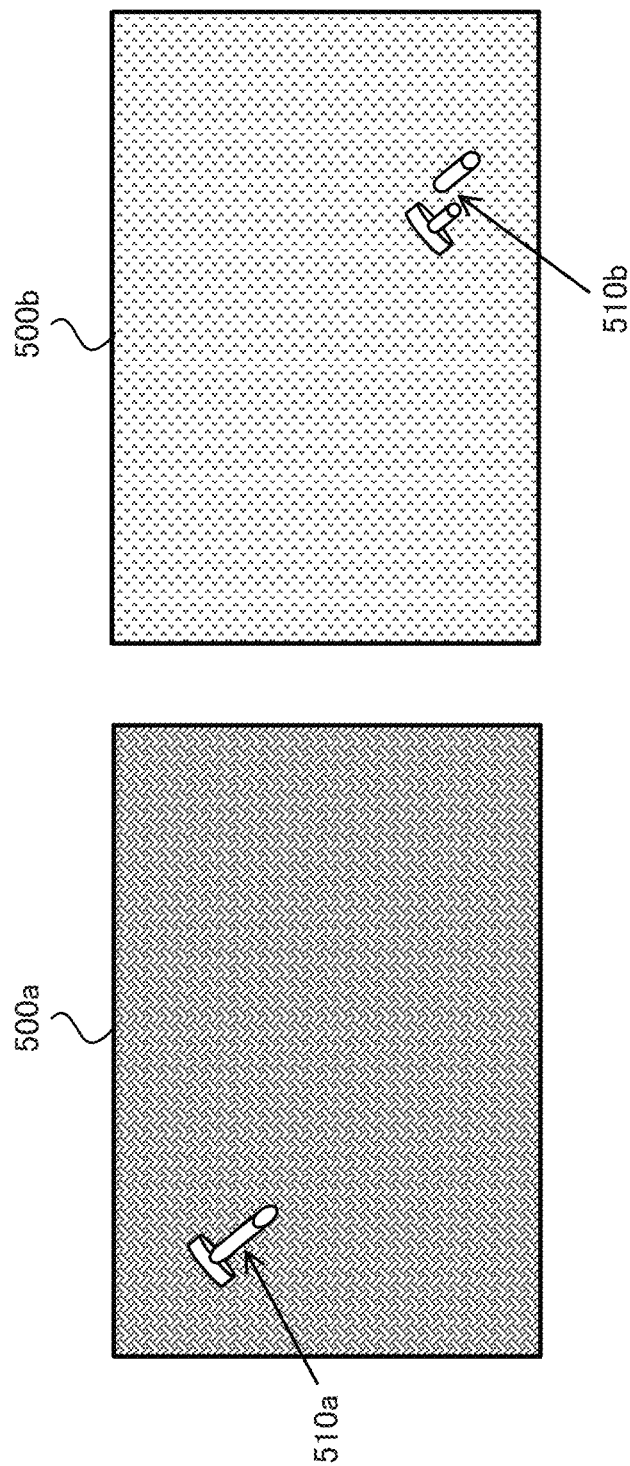
FIG. 3 is a diagram illustrating an example of normal nail and abnormal nail arranged at different positions on different backgrounds.

FIG. 3 is a diagram illustrating an example of a normal nail and an abnormal nail arranged at different positions on different backgrounds. As illustrated in FIG. 3, a normal nail 510a and an abnormal nail 510b are arranged on different positions on images 500a and 500b having different backgrounds, respectively.

In one embodiment, description will be made in relation to a scheme that intends to enhance the precision in detecting abnormality of a target in cases where multiple background patterns of a target exist and/or the target may be deformed from its original shape (i.e., in cases where the target is abnormal) due to breaking as exemplarily illustrated in FIG. 3.

(1-2) Description of Information Processing by Information Processing Apparatus

Figure 4:
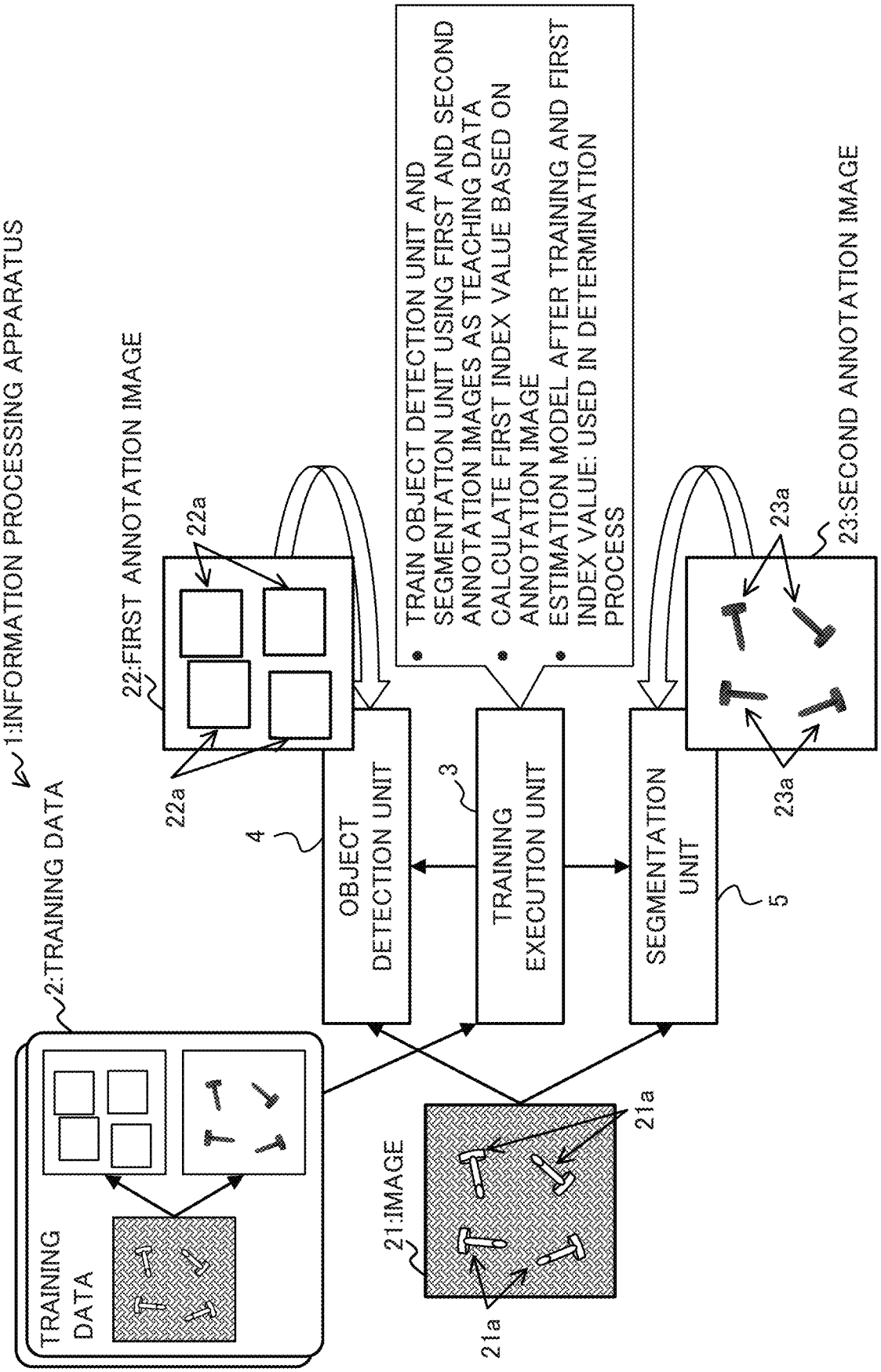
FIG. 4 is a diagram illustrating an example of a training process by an information processing apparatus according to one embodiment.

FIG. 4 is a diagram illustrating an example of a training process among information processing performed by an information processing apparatus 1 according to one embodiment. In the following description, a "target" is assumed to be an object like a nail, and an "image" is assumed to be an image including a target and a background.

As illustrated in FIG. 4, the information processing apparatus 1 may include a training execution unit 3, an object detection unit 4, and a segmentation unit 5 serving as processing functions in a training phase.

The training execution unit 3 may train an estimation model including the object detection unit 4 and the segmentation unit 5 through executing the following processes (a) to (c).

(a) The training execution unit 3 acquires a data set including multiple training data 2.

The training data 2 may include an image 21, a first annotation image 22, and a second annotation image 23.

The image 21 is an example of an image obtained by photographing a training target, and may include one or more targets 21a to be learned. The object 21a may be a normal object, for example. The first annotation image 22 is an example of first annotation data and is an image representing a rectangular region 22a including the target 21a in the image 21. The second annotation image 23 is an example of second annotation data and is an image representing one or more pixels 23a corresponding to the target 21a in the image 21.

(b) The training execution unit 3 trains the object detection unit 4 on the basis of the image 21 in the data set and the first annotation image 22, and trains the segmentation unit 5 on the basis of the image 21 in the data set and the second annotation image 23.

The object detection unit 4 is an example of an object detection model, and specifies the rectangular region including the target 21a in the image 21 in response to inputting of the image 21. Examples of the object detection unit 4 are various NNWs for object detection, and the object detection unit 4 is assumed to be YOLO in one embodiment, for example.

The segmentation unit 5 is an example of a NNW and uses one or more pixels estimated to correspond to the target 21a in the image 21 in response to an input as an output. Examples of the segmentation unit 5 are various NNWs for segmentation, and the segmentation unit 5 is assumed to a U-Net in one embodiment. The segmentation unit 5 is not limited to a U-Net, but may alternatively be a neural network that executes Semantic Segmentation or executes a segmentation scheme except for Semantic Segmentation.

For example, the training execution unit 3 may input the image 21 into the object detection unit 4 for each training data 2 included in the data set and carry out machine learning on the object detection unit 4, using the first annotation image 22 as teaching data. In addition, the training execution unit 3 may input the image 21 into the segmentation unit 5 for each training data 2 included in the data set and carry out machine learning on the segmentation unit 5, using the second annotation image 23 as teaching data.

(c) The training execution unit 3 calculates a first index value related to a relationship between a pixel number corresponding to a rectangular region 22a including the target 21a specified by the first annotation image 22 and the number (pixel number) of pixels 23a corresponding to the target 21a specified by the second annotation image 23.

The estimation model trained in the above process (b) and the first index value calculated in the above process (c) are used in a determination process that determines, using a trained estimation model, whether or not an target that is included in the target image and that is to be determined is in the normal state.

Figure 5:
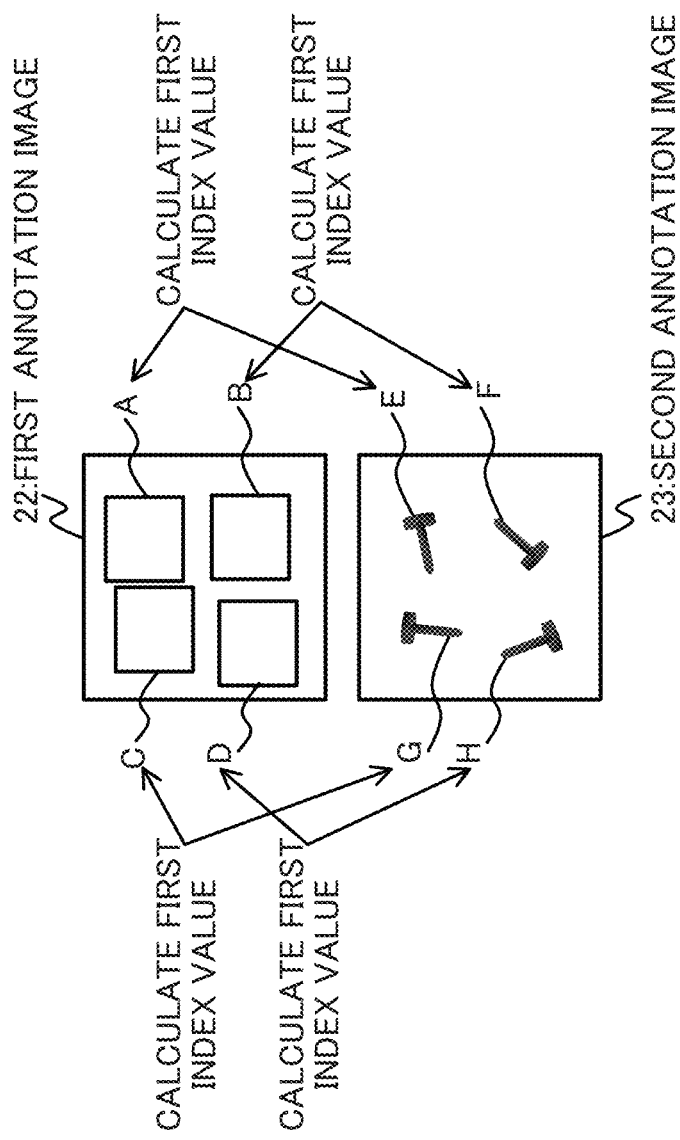
FIG. 5 is a diagram illustrating an example of calculating a first index value.

FIG. 5 is a diagram illustrating an example of calculating the first index value. For example, the training execution unit 3 may calculate a pixel number in the rectangular region 22a included in the first annotation image 22 for each target 21a. In the example of FIG. 5, pixel numbers A-D may be calculated. The pixel numbers A-D are examples of an area of each rectangular region 22a in the first annotation image 22.

For example, the training execution unit 3 may calculate a pixel number of the pixels 23a included in the second annotation image 23 for each target 21a. In the example of FIG. 5, pixel numbers E-H may be calculated. The pixel numbers E-H are examples of an area of each pixel 23a in the second annotation image 23.

Then the training execution unit 3 may calculate the first index value related to a relationship between the pixel numbers A-D of the rectangular regions 22a and the pixel numbers E-H of the pixels 23a.

Alternatively, the training execution unit 3 may calculate the first index value for each target 21a. For example, the training execution unit 3 may calculate the first index value between the pixel number A and the pixel number E; the first index value between the pixel number B and the pixel number F; the first index value between the pixel number C and the pixel number G; and the first index value between the pixel number D and the pixel number H.

Further alternatively, the training execution unit 3 may calculate the first index value for each training data 2 included in the data set.

By calculating the first index value as the above, the relationship for pixel number between the rectangular region 22a including the target 21a and the pixels 23a corresponding to the target 21a can be normalized. This makes it possible to quantatively recognize a correlation value (expected value) between output results from the object detection unit 4 and the segmentation unit 5, both into which the image 21 of the normal target 21a is input, regardless the size of the target 21a in the mage 21.

Figure 6:
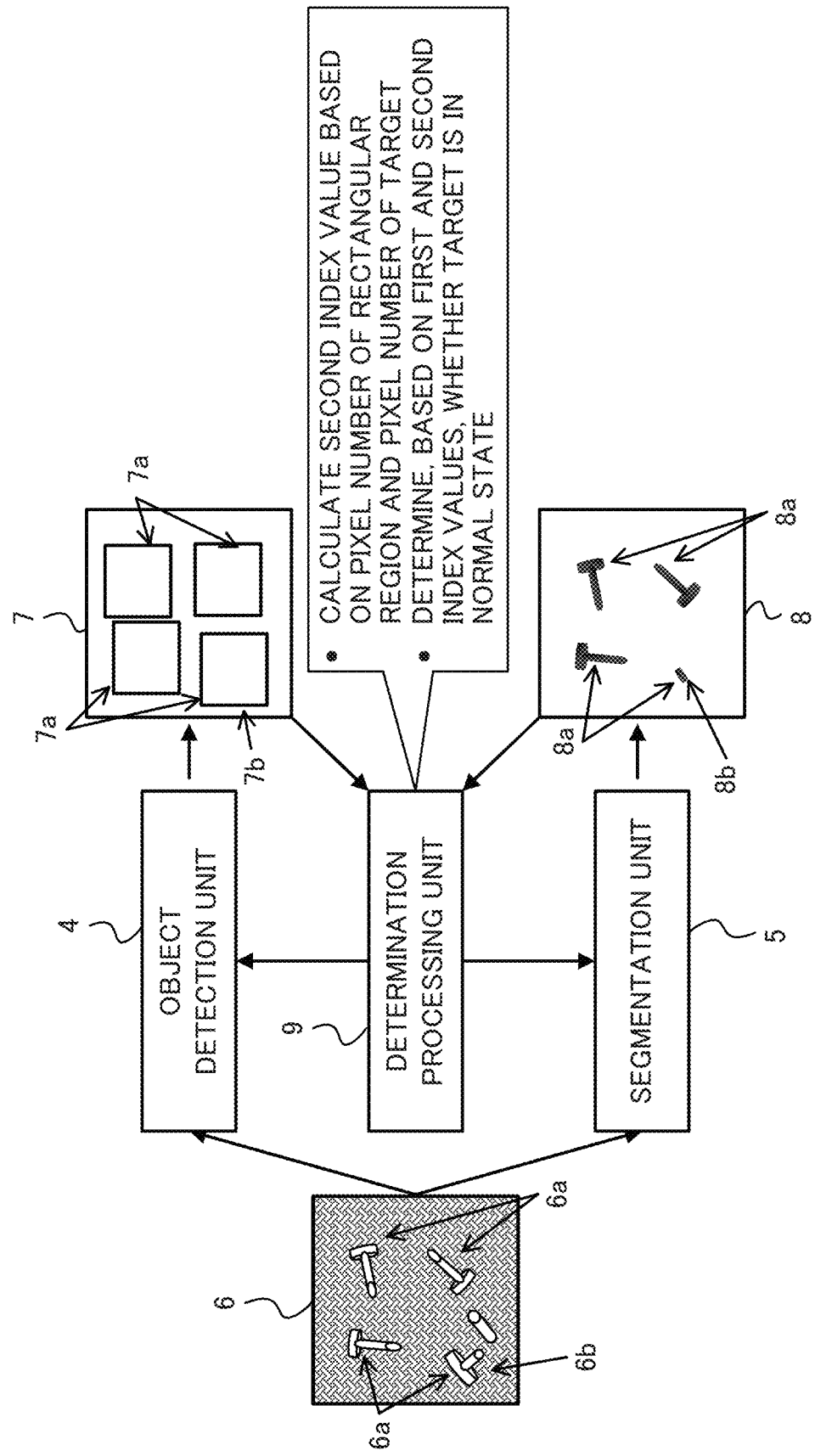
FIG. 6 is a diagram illustrating an example of a determination process by the information processing apparatus according to one embodiment.

FIG. 6 is a diagram illustrating an example of determination process among the information processes by the information processing apparatus 1 according to one embodiment.

As illustrated in FIG. 6, the information processing apparatus 1 may include the trained object detection unit 4, the trained segmentation unit 5, and a determination processing unit 9 for the purpose of a determination process in the determination phase.

As illustrated in FIG. 6, an image 6 is an example of a target image including one or more targets 6a to be determined. The image 6 may include an abnormal target 6b such as a broken nail.

The determination processing unit 9 carries out, based on a second index value on the basis of an output result output from the trained estimation model in response to inputting of the image 6 and the first index value calculated by the training execution unit 3, a determination process that determines whether or not the target 6a included in the image 6 is in the normal state.

For example, the determination processing unit 9 calculates a second index value related to a relationship between a pixel number corresponding to a rectangular region 7a specified by an estimation result 7 obtained by using the object detection unit 4 and a pixel number of the pixels 8a corresponding to the target 6a specified by an estimation result 8 obtained by using the trained segmentation unit 5.

Figure 7:
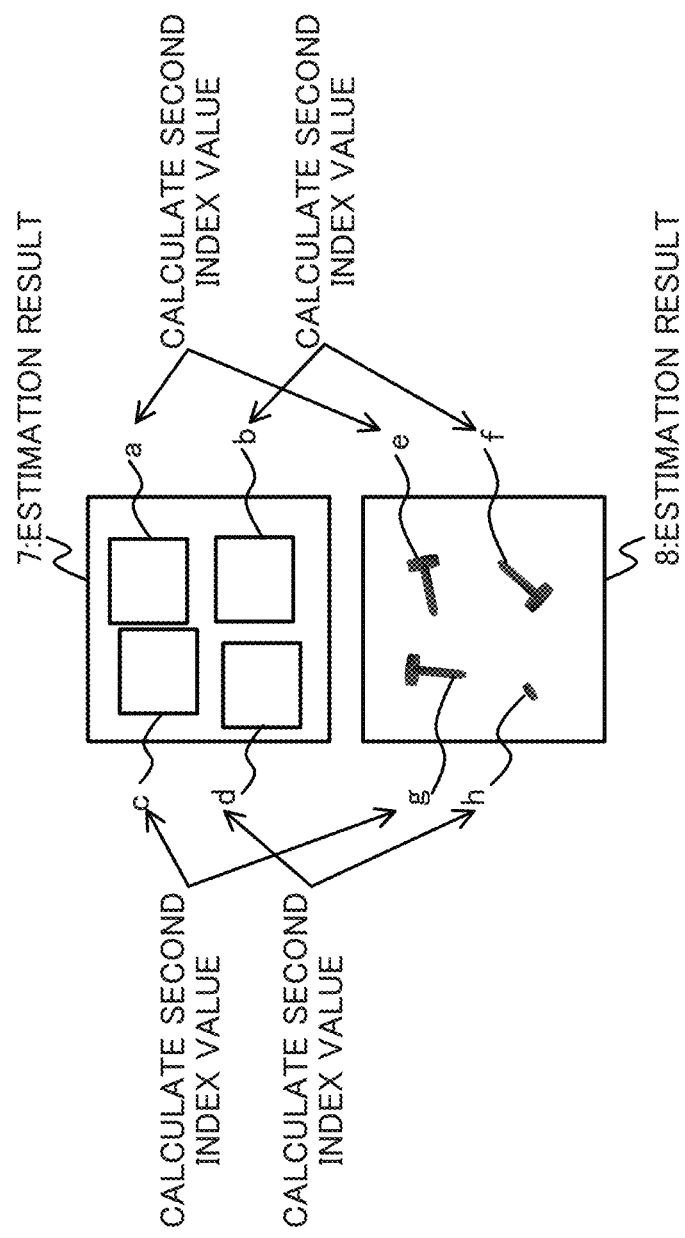
FIG. 7 is a diagram illustrating an example of calculating a second index value.

FIG. 7 is a diagram illustrating an example of calculating the second index value. The determination processing unit 9 may calculate the pixel number in the rectangular region 7a included in the estimation result 7 obtained by using the object detection unit 4 for each target 6a, for example. In the example of FIG. 7, the pixel numbers a-d may be calculated. The pixel numbers a-d are examples of the area of each rectangular region 7a in the estimation result 7.

For example, the determination processing unit 9 may calculate a pixel number of the pixels 8a included in the estimation result 8 obtained by using the segmentation unit 5 for each target 6a. In the example of FIG. 7, pixel numbers e-h may be calculated. The pixel numbers e-h are examples of an area of each pixel 8a in the estimation result 8.

Then the determination processing unit 9 may calculate the second index value related to the relationship between the pixel numbers a-d of the rectangular regions 7a and the pixel numbers e-h of the pixels 8a for each image 6.

Alternatively, the determination processing unit 9 may calculate the second index value for each target 6a. For example, the determination processing unit 9 may calculate the second index value between the pixel number a and the pixel number e; the second index value between the pixel number b and the pixel number f; the second index value between the pixel number c and the pixel number g; and the second index value between the pixel number d and the pixel number h.

By calculating the second index value as the above, the relationship between the pixel number of the rectangular region 7a including the target 6a and the pixel number of the pixels 8b corresponding to the target 6a can be normalized. This makes it possible to quantatively recognize a correlation value between output results from the object detection unit 4 and the segmentation unit 5, both into which the image 6 of the normal target 6a is input, regardless the size of the target 6a in the image 6.

This makes it possible to derive a significant difference between the correlation value (expected value) when the image 21 of the normal target 21a is input and the correlation value when the image 6 of the abnormal target 6b is input in regard of the output results from the object detection unit 4 and the segmentation unit 5.

Accordingly, the determination processing unit 9 can determine, based on multiple first index values and the second index value, for example, whether or not the target 6a included in the image 6 is in the normal state.

An example of the determination logic based on the first and the second index values will be detailed below.

As described above, according to the information processing apparatus 1 of one embodiment, the determination process is carried out on the basis of the index values related to relationships between the pixel number related to an estimation result of the object detection unit 4 and the pixel number related to an estimation result of the segmentation unit 5.

The object detection unit 4 outputs a rectangular region including a target in the input image, and the segmentation unit 5 outputs one or more pixels estimated to correspond to the target in the input image. As the above, the object detection unit 4 and the segmentation unit 5 output an estimation result less effected by the background of the image.

Accordingly, the information processing apparatus 1 is able to detect possible abnormality (e.g., the target 6b) of the target 6a by discriminating the target 6a and the background of the target 6a included in the image 6 in the determination process based on the first and the second index values.

Since the object detection unit 4 and the segmentation unit 5 exemplified by YOLO and U-Net, respectively, are not algorithms designed for detecting abnormality of a target, there is low possibility of these units are independently of each other used for the above abnormality detection. In contrast to the above, the information processing apparatus 1 of one embodiment achieves enhancement in precision in detecting abnormality of a target by combining these algorithms with each other and additionally performing the determination process that uses outputs of the both algorithms.

For example, object-detecting Artificial Intelligence (AI) including the object detection unit 4 can output an appropriate rectangular region even if the target is partially lost or deformed. In other words, the object-detecting AI can robustly detect the target against a change in shape of the target.

In contrast, segmentation AI including the segmentation unit 5 is relatively sensitive to a change in shape of a target. For example, the segmentation AI is sometimes unable to detect a target in cases where the target is partially lost or deformed because the segmentation AI is trained by using only the targets having a normal shape among targets having normal and abnormal shapes.

The information processing apparatus 1 of one embodiment can detect abnormality of a target deformed from the original normal shape of the target by utilizing the difference in the ability of estimation between the object detecting AI and the segmentation AI, which have different sensitivities to a target in the abnormal state as the above.

As described above, the information processing apparatus 1 of one embodiment can enhance the precision in detecting abnormality of a target.

(1-3) Example of Configuration of One Embodiment

The following description will now be made in relation to a case where the determination process by the information processing apparatus 1 is applied to abnormality detection of a part called the interventricular septum of a fetus heart in ultrasonographic diagnosis.

Figure 8:
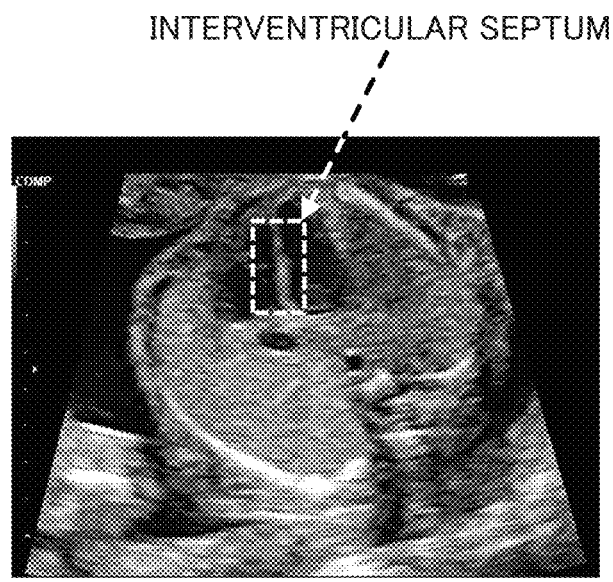
FIG. 8 is a diagram illustrating an example of a normal interventricular septum of a ultrasonographic image.
Figure 9:
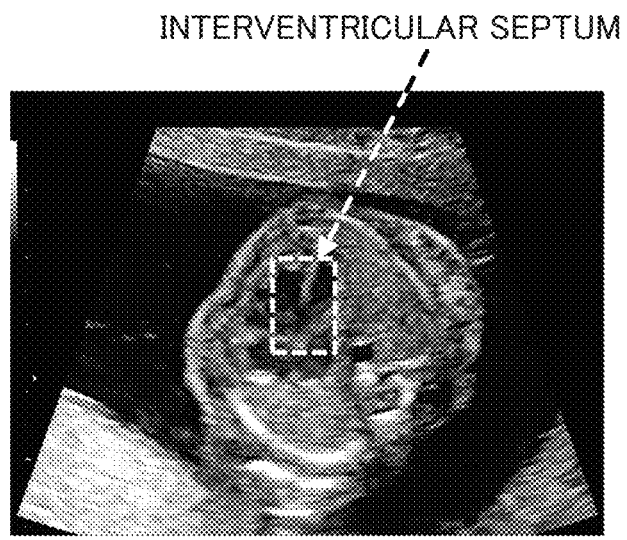
FIG. 9 is a diagram illustrating an example of an abnormal interventricular septum of a ultrasonographic image.

It is important for ultrasonographic check of a fetus heart to determine the presence or the absence of a defect in interventricular septum. FIG. 8 is a diagram illustrating an example of a normal interventricular septum of a ultrasonographic image; and FIG. 9 is a diagram illustrating an example of an abnormal interventricular septum of a ultrasonographic image. No defect is observed on the interventricular septum in the example of FIG. 8, but a defect and the resultant deformation are observed on the interventricular septum in the example of FIG. 9.

In detecting a defect on the interventricular septum illustrated in FIG. 9, at least one of the following inconvenience (A)-(C) may occur.

(A) A ultrasonographic image sometimes contains much noise, which may be detected to be abnormality of the interventricular septum.

(B) The position of the interventricular septum in the ultrasonographic image is changed with the operation of the probe.

(C) When the interventricular septum has a defect, the shape of the interventricular septum are largely deformed.

Hereinafter, description will now be made in relation to an example of a case where the information processing apparatus 1 solves the above inconvenience. The following description assumes that the target is an interventricular septum and an image to be determined is a ultrasonographic image such as an echographic image obtained by photographing a fetus thorax.

Figure 10:
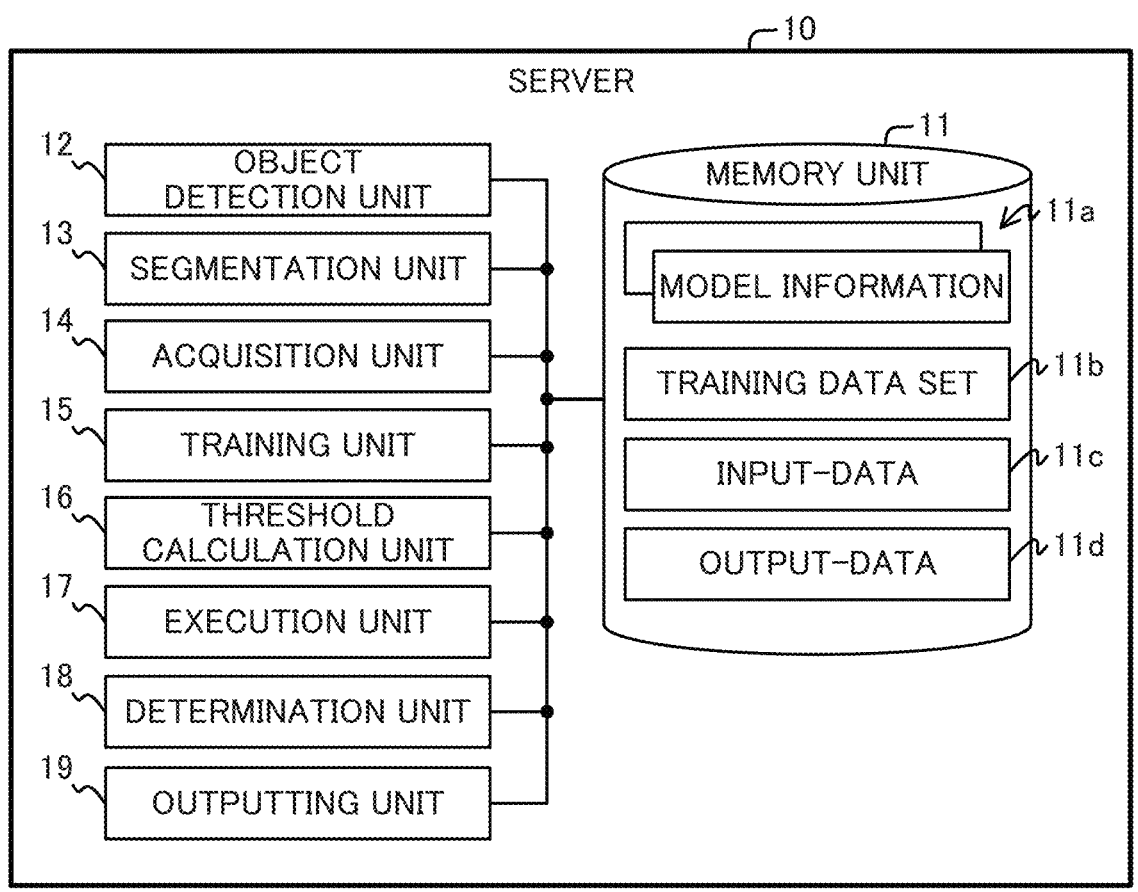
FIG. 10 is a block diagram illustrating an example of a functional configuration of a server according to one embodiment.

FIG. 10 is a diagram illustrating an example of a functional configuration of a server 10 of one embodiment. The server 10 is an example of an apparatus that determines whether or not a target included in the image is in the normal state and is an example of the information processing apparatus 1 illustrated in FIGS. 4-7.

As illustrated in FIG. 10, the server 10 exemplarily includes a memory unit 11, an object detection unit 12, a segmentation unit 13, an acquisition unit 14, a training unit 15, a threshold calculating unit 16, an execution unit 17, a determination unit 18, and an outputting unit 19.

The memory unit 11 is an example of a storing region and stores various pieces of information to be used for training the object detection unit 12 and the segmentation unit 13, execution (estimation), and outputting. As illustrated in FIG. 10, the memory unit 11 can exemplarily stores multiple pieces of model information 11a, a training data set 11b, input-data 11c, and output-data 11d.

The object detection unit 12 is an example of the object detection unit 4 illustrated in FIG. 1, and for example, specifies a rectangular region including a target in an image in response to inputting of the image. An example of the object detection unit 12 may be an object-detecting NNW such as YOLO.

The segmentation unit 13 is an example of the segmentation unit 5 illustrated in FIG. 1, and for example, uses one or more pixels estimated to correspond to a target in an image in response to inputting of the image as an output. An example of the segmentation unit 13 may be a NNW that carries out segmentation of an image using a machine learning scheme, and is U-Net. The segmentation unit 13 is not limited to a U-Net, but may alternatively be a neural network that executes Semantic Segmentation or executes a segmentation scheme except for Semantic Segmentation.

Information about the network structure and various parameters to achieve the object detection unit 12 and the segmentation unit 13 may be stored as the model information 11a for each of the object detection unit 12 and the segmentation unit 13 in the memory unit 11, for example.

The acquisition unit 14 acquires information to be used for training and executing an estimation model including the object detection unit 12 and the segmentation unit 13 from, for example, a non-illustrated computer.

For example, the acquisition unit 14 acquires the training data set 11b to be used for training the estimation model and stores the acquired training data set into the memory unit 11.

The training data set 11b is an example of a data set including multiple pieces of training data, each piece including an image obtained by photographing a training target, first annotation data representing a rectangular region including the training target in the image, and second annotation data representing one or more pixels corresponding to the training target in the image.

Figure 11:
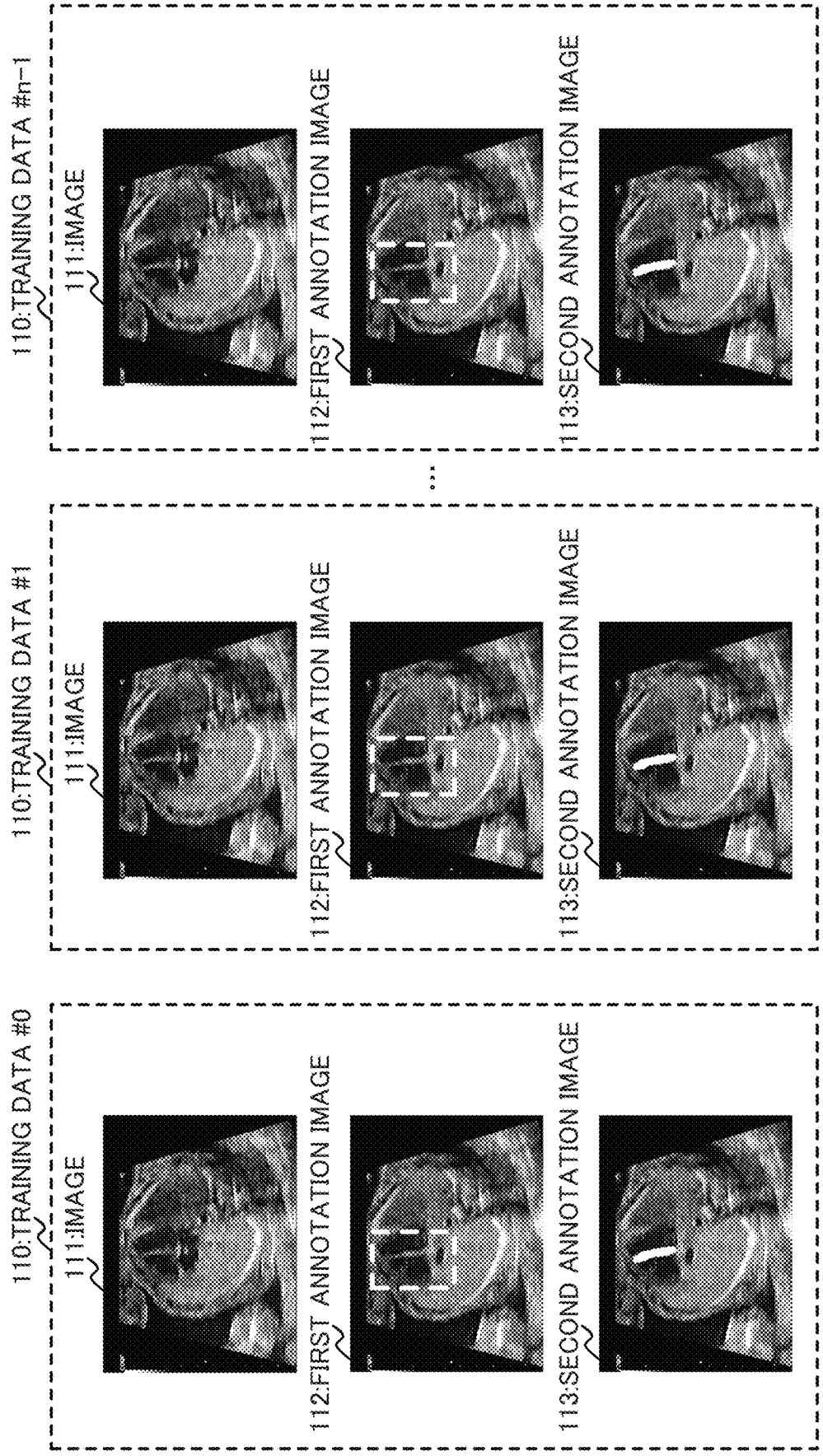
FIG. 11 is a diagram illustrating an example of a training data set.

For example, the training data set 11b may include n (n is an integer of two or more) training data 110 as illustrated in FIG. 11. Each training data 110 may include an image 111 obtained by photographing a training target, a first annotation image 112 representing a rectangular region including the training target in the image 111, and a second annotation image 113 representing one or more pixels corresponding to the training target in the image 111.

For example, the image 111 may be an echographic image obtained by photographing an interventricular septum serving as an example of a training target as illustrated in FIG. 11. The echographic images of multiple training data 110 may be frames chronologically (e.g., t=0 to (n-1)) extracted from a series of echographic images, frames extracted from different moving images, or images photographed as still images.

The first annotation image 112 is an example of the first annotation data, and is an image representing an annotation of rectangular information including an interventricular septum included in the image 111 of the training data 110 as illustrated in FIG. 11. The rectangular information may be an image representing a region enclosed by the white dotted-lines in FIG. 11, for example.

The second annotation image 113 is an example of the second annotation data, and is an image representing an annotation in a unit of a pixel of an interventricular septum included in the image 111 of the training data 110 as illustrated in FIG. 11. For example, the second annotation image 113 may be an image obtained by masking the interventricular septum included.

Here, "to mask" means to display a region to be masked in such a manner that the region can be discriminated from a region not to be masked. An example of masking is filling the region to be masked in a predetermined color, in other words, setting a predetermined color to pixels at the region to be masked. In the example of FIG. 11, the masked region, i.e., a region corresponding to the interventricular septum, is filled in white. In the second annotation image 113, the region except for the interventricular septum may be filled in black or another color.

The acquisition unit 14 may acquire input-data 11c to be used for the determination process to be performed by the object detection unit 12 and the segmentation unit 13, and store the acquired input-data 11c into the memory unit 11.

Figure 12:
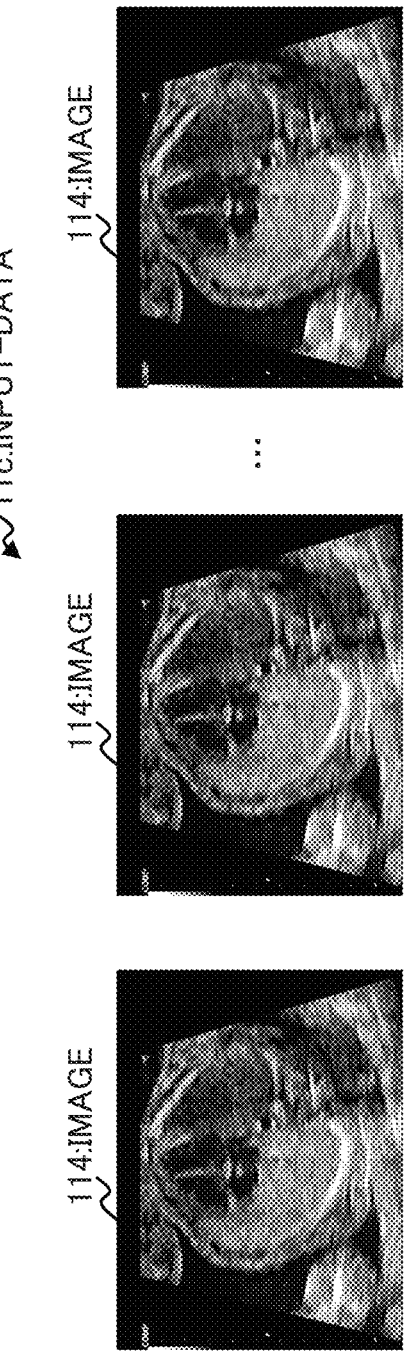
FIG. 12 is a diagram illustrating an example of input-data.

The input-data 11c is an image set containing one or more images to be determined, which may be a moving image such as a video image including multiple frames. In one embodiment, the input-data 11c may be echography image including multiple images 114 such as echographic images as illustrated in FIG. 12. The image 114 is an example of a target image to be input into the object detection unit 12 and the segmentation unit 13 in the determination process.

The training unit 15 is a training execution unit that trains the object detection unit 12 and the segmentation unit 13, and specifically trains the object detection unit 12 and the segmentation unit 13, using the training data set 11b that the acquisition unit 14 acquires.

Figure 13:
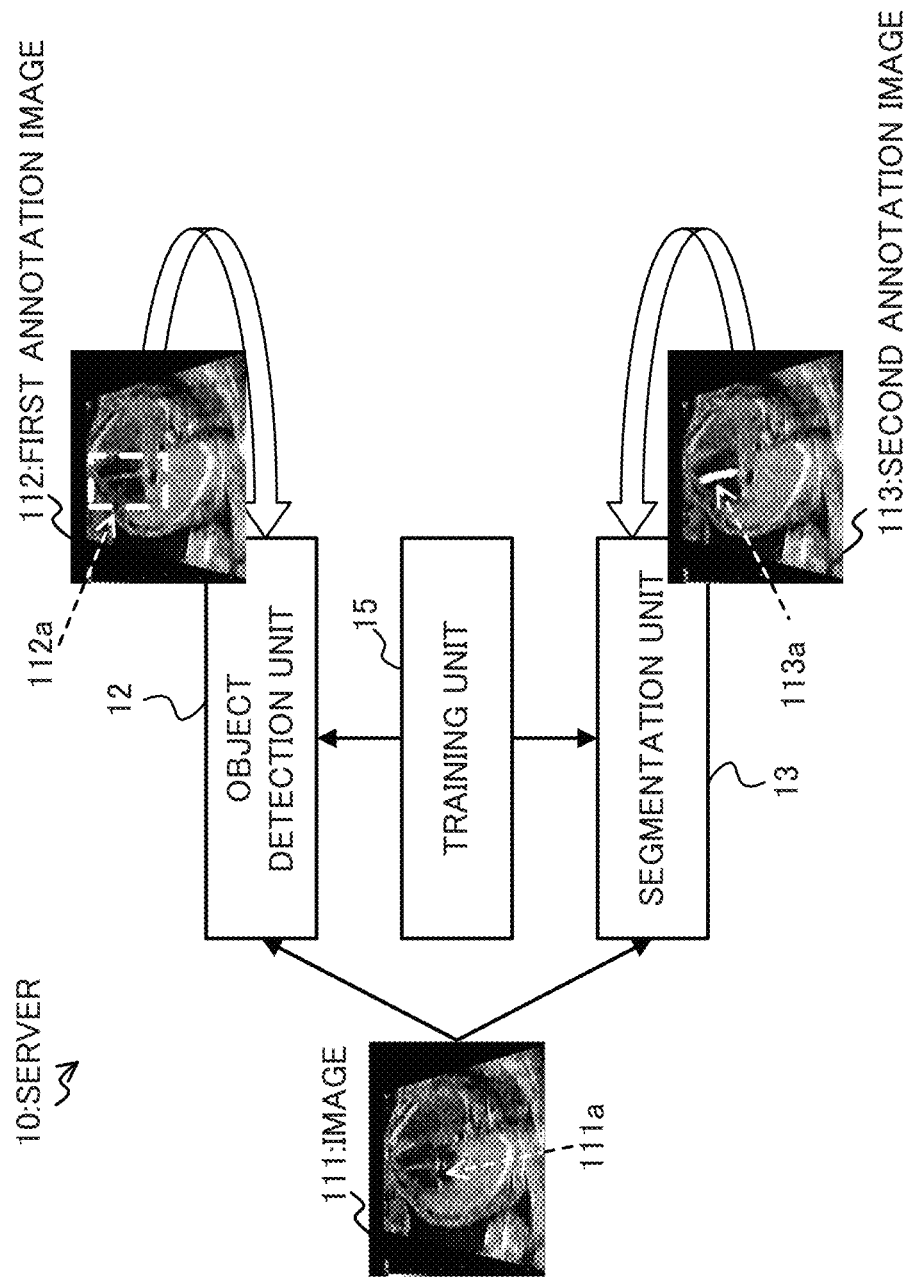
FIG. 13 is a diagram illustrating an example of a machine learning process on an object detection unit and a segmentation unit by a training unit.

FIG. 13 is a diagram illustrating an example of a machine learning process performed on the object detection unit 12 and the segmentation unit 13 by the training unit 15. As illustrated in FIG. 13, the training unit 15 inputs the image 111 including the interventricular septum serving as the target 111a into both the object detection unit 12 and the segmentation unit 13.

Then the training unit 15 executes machine learning on the object detection unit 12, using an estimation result that is obtained in response to inputting of the image 111 and that the object detection unit 12 outputs and the first annotation image 112 including annotation of a rectangular region 112a.

The training unit 15 executes machine learning on the segmentation unit 13, using an estimation result that is obtained in response to inputting of the image 111 and that the segmentation unit 13 outputs and the second annotation image 113 including one or more pixels 113a corresponding to the target 111a.

Through the machine learning process on the estimation model by the training unit 15, the object detection unit 12 is trained so as to specify (output) a rectangular region including the target in the input image likewise the first annotation image 112. The segmentation unit 13 is trained so as to output one or more pixels estimated to correspond to the target of the input image likewise the second annotation image 113, in other words, so as to carry out segmentation on the target.

Any known scheme may be applied to a scheme of machine learning on the estimation model, i.e., the object detection unit 12 and the segmentation unit 13, using the first annotation image 112 and the second annotation image 113 as the teaching data.

For example, in order to reduce the value of an error function obtained on the basis of an estimation result obtained by a forward propagation performed by the object detection unit 12 in response to inputting of the image 111 and the first annotation image 112, a back propagation may be executed to determine a parameter to be used in a process of the forward propagation.

For example, in order to reduce the value of an error function obtained on the basis of an estimation result obtained by a forward propagation performed by the segmentation unit 13 in response to the inputting of the image 111 and the second annotation image 113, a back-propagation may be executed to determine a parameter to be used in a process of the forward propagation.

In the machine learning process, an updating process may be carried out to update a variable such as a weight on the basis of a result of the back propagation.

The parameter and variable may be included in the model information 11a. The training unit 15 may update the model information 11a in accordance with execution of the machine learning process.

The training unit 15 may repeat the machine learning process on each of the object detection unit 12 and the segmentation unit 13, using the multiple training data 110 included in the training data set 11b until the repeat number or the precision reaches the threshold, for example. The object detection unit 12 and the segmentation unit 13 that have completed the training are collectively an example of a trained model.

The threshold calculating unit 16 calculates one of or both the thresholds at an upper limit and a lower limit of a second index value to be detailed below to determine whether or not the target included in the image 114 is in the normal state. For example, the threshold calculating unit 16 may calculate the thresholds in the following procedural steps (i) to (iii).

(i) The threshold calculating unit 16 calculates a first index value related to a relationship between the pixel number corresponding to the rectangular region 112a and the pixel number of the pixels 113a.

The first index value may be a ratio between the pixel number corresponding to the rectangular region 112a including the target 111a specified by the first annotation image 112 and the pixel number corresponding to the pixels 113a corresponding to the target 111a specified by the second annotation image 113.

The threshold calculating unit 16 serving as an example of a first index value calculation unit calculates a first index value indicating a ratio of the area of the pixel number of the target 111a (see FIG. 13) of the second annotation image 113 to the area of the rectangular region 112a (see FIG. 13) of the first annotation image 112, for example.

For example, the threshold calculating unit 16 may calculate the first index value of each of the multiple images 111 included in the training data set 11b and also of each of one or more targets 111a included in each of the images 111. For this purpose, the threshold calculating unit 16 may use the pixel numbers of the rectangular region 112a of the first annotation image 112 and the pixel value of the pixels 113a of the second annotation image 113 for each training data 110.

As described above, the object detection unit 12 and the segmentation unit 13 have a difference in sensitivity to a change of the shape of the target 111a. In other words, the first index value can be regarded as an index value that reflects the difference in sensitivity to a change of the shape of the target 111a between the object detection unit 12 and the segmentation unit 13. For the above, by calculating the ratio serving as the first index value, the first index value when the target 111a is in the normal state can be normalized among multiple targets 111a, and consequently, the correlation value between the output results from the object detection unit 12 and the segmentation unit 13 can be easily acquired.

The first index value is not limited to the ratio, and may alternatively be any information from which the correlation value between the output results from the object detection unit 12 and the segmentation unit 13 can be obtained.

(ii) The threshold calculating unit 16 calculates the average and the variance of multiple first index values.

The threshold calculating unit 16 is an example of a calculating unit that calculates an average and a variance of multiple first index values calculated on the basis of the multiple first annotation images 112 and multiple second annotation images 113 included in the training data set 11b.

(iii) The threshold calculating unit 16 determines one or more thresholds based on the calculated average and variance.

Figure 14:
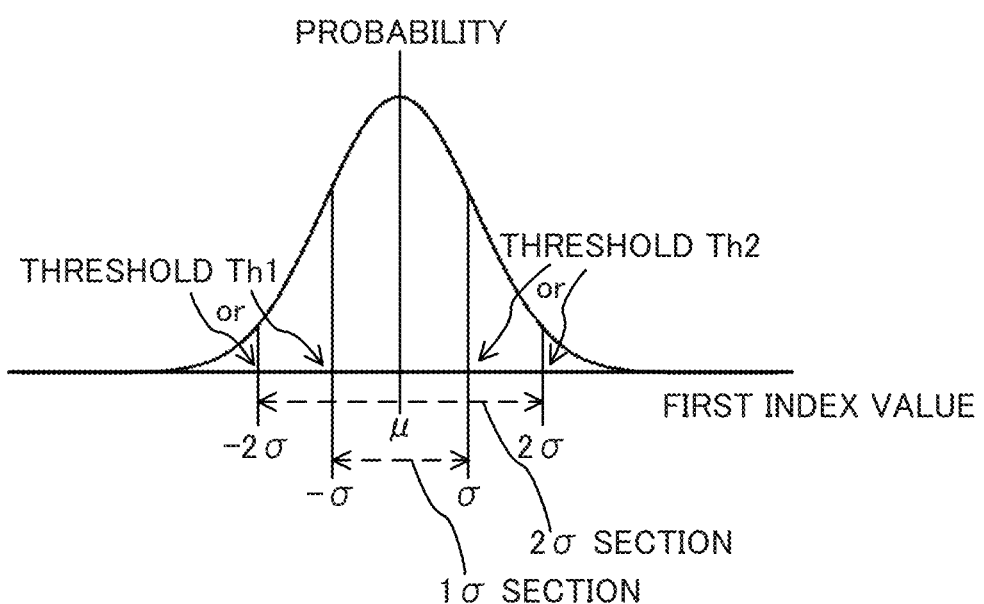
FIG. 14 is a diagram illustrating an example a determination process of upper-limit and lower-limit thresholds by a threshold calculation unit.

As an example, a case where the first index value is normally distributed is assumed. The calculated average and variance are represented by $\mu$ and $\sigma^2$, respectively. In this case, the threshold calculating unit 16 may calculate a standard deviation $\sigma$ being the square root of the calculated variance $\sigma^2$ as illustrated in FIG. 14 and determine the values of the first index value of the $2\sigma$ section, i.e., at points distant by $\pm 2\sigma$ from the average $\mu$ serving as the center of the section, to be lower-limit and upper-limit thresholds. In the example of FIG. 14, the threshold calculating unit 16 determines the values $(\mu-2\sigma)$ and $(\mu+2\sigma)$ to be the lower-limit threshold Th1 and the upper-limit threshold Th2, respectively.

As described above, the threshold calculating unit 16 calculates the average and the variance of multiple first index value as the target 111a is in a normal state and determines thresholds Th1 and Th2 based on the calculated average and variance. The thresholds Th1 and Th2 represent boundaries of a range (e.g., the 2σ section) where multiple first index values are concentrated. Accordingly, determination of the thresholds Th1 and Th2 makes it possible to easily determine whether or not a second index value to be detailed below is included in a range where multiple first index values are concentrated.

As illustrated in FIG. 14, the threshold calculating unit 16 may alternatively determine the values (μ−σ) and (μ+σ) to be the lower-limit threshold Th1 and the upper-limit threshold Th2, respectively, by using the first index values at the 1σ section, i.e., at points distant by ±σ from the average μ serving as the center of the section.

The foregoing example assumes that the first index value is normally distributed, but the distribution of the first index value is not limited to this. The threshold calculating unit 16 may determine the thresholds in accordance with various distributions of the first index values. Alternatively, the threshold calculating unit 16 may calculate the quartiles of the multiple first index values and determine the first quartile and the third quartile to be the lower-limit threshold Th1 and the upper-limit threshold Th2, respectively.

The execution unit 17 executes an estimation process on the target related to the input-data 11c, using the object detection unit 12 and the segmentation unit 13 (also referred to as the trained object detection unit 12 and the trained segmentation unit 13) that has completed training by the training unit 15.

Figure 15:
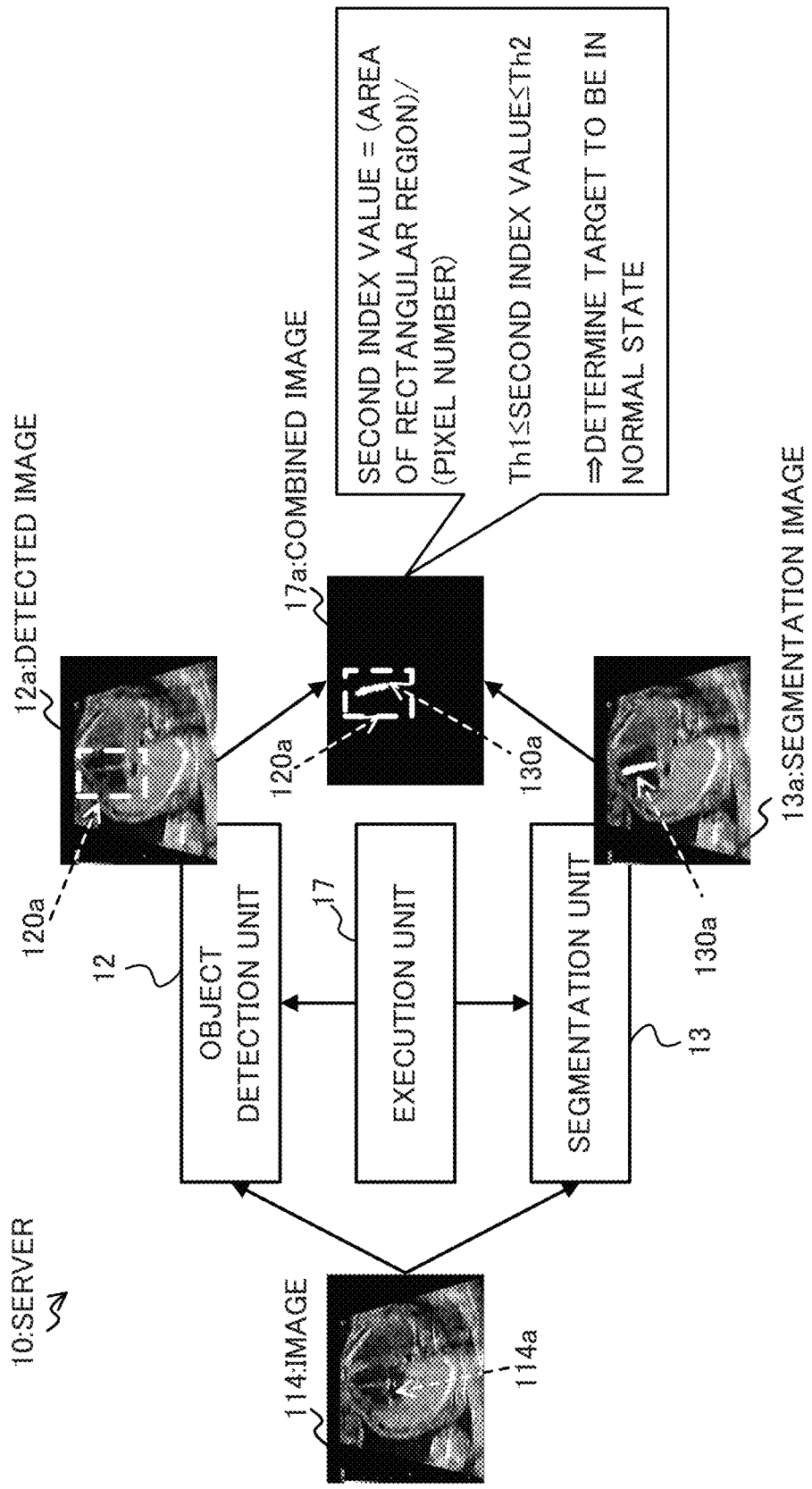
FIG. 15 is a diagram illustrating of an example of an estimation process by an execution unit.

FIG. 15 is a diagram illustrating of an example of the estimation process performed by the execution unit 17. As illustrated in FIG. 15, the execution unit 17 extracts an image 114 included in the input-data 11c in the estimation process.

Then the execution unit 17 carries out, in the estimation process, an object detection process by inputting the image 114 into the object detection unit 12 and acquiring a detected image 12a which is the estimation result image output from the object detection unit 12. In addition, the execution unit 17 carries out, in the estimation process, a segmentation process by inputting the image 114 into the segmentation unit 13 and acquiring a segmentation image 13a which is the estimation result image output from the segmentation unit 13.

The detected image 12a may include a rectangular region 120a specified by the estimation result acquired by the trained object detection unit 12. The rectangular region 120a is a rectangular region 120a corresponding to the target 114a included in the image 114. The segmentation image 13a may include one or more pixels 130a corresponding to the target 114a included in the image 114 specified by the estimation result by the trained segmentation unit 13.

In the estimation process, the execution unit 17 may carry out a combination process that generates a combined image 17a by combining the acquired detected image 12a with the acquired segmentation image 13a. The combined image 17a may be image data including at least the rectangular region 120a included in the detected image 12a and the pixels 130a included in the segmentation image 13a. The background of the combined image 17a may be of mono-color such as solid black as illustrated in FIG. 15 or may be the same as that of the image 114.

The determination unit 18 executes a determination process that determines whether or not the target 114a included in the image 114 is in the normal state on the basis of a set of the detected image 12a and the segmentation image 13a or a set of the rectangular region 120a and the pixels 130a included in the combined image 17a.

For example, the determination unit 18 calculates a second index value related to a relationship between a pixel number corresponding to a rectangular region 120a and a pixel number of the pixels 130a corresponding to the target 114a in the output result from the trained estimation model in response to inputting of the image 114 including the target 114a to be determined.

The second index value may be, for example, a ratio between the pixel number corresponding to the rectangular region 120a specified by the estimation result obtained by using the object detection unit 12 and the pixel number of the pixels 130a corresponding to the target 114a specified by the estimation result obtained by using the segmentation unit 13.

For example, the determination unit 18 calculates, as the second index value, a ratio of the pixel number of the pixel 130a (see FIG. 15) of the combined image 17a or the segmentation image 13a to the rectangular region 120a (see FIG. 15) of the combined image 17a or the detected image 12a. The determination unit 18 is an example of a second index value calculation unit.

For example, the determination unit 18 may calculate the second index value for each of multiple images 114 included in the input-data 11c and also for each of one or more targets 114a included in each image 114.

Then the determination unit 18 may determine whether or not the target 114a included in the image 114 is in the normal state on the basis of the calculated second index value and the first index value that the threshold calculating unit 16 calculates. For example, the determination unit 18 may determine normality or abnormality of the target 114a by comparing the second index value with the thresholds Th1 and Th2 determined on the basis of the first index value.

As an example, the determination unit 18 may determine that the target 114a is in the normal state when the calculated second index value is equal to or more than the lower-limit threshold Th1 and also equal or less than the upper-limit threshold Th2, as illustrated in FIG. 15.

Figure 16:
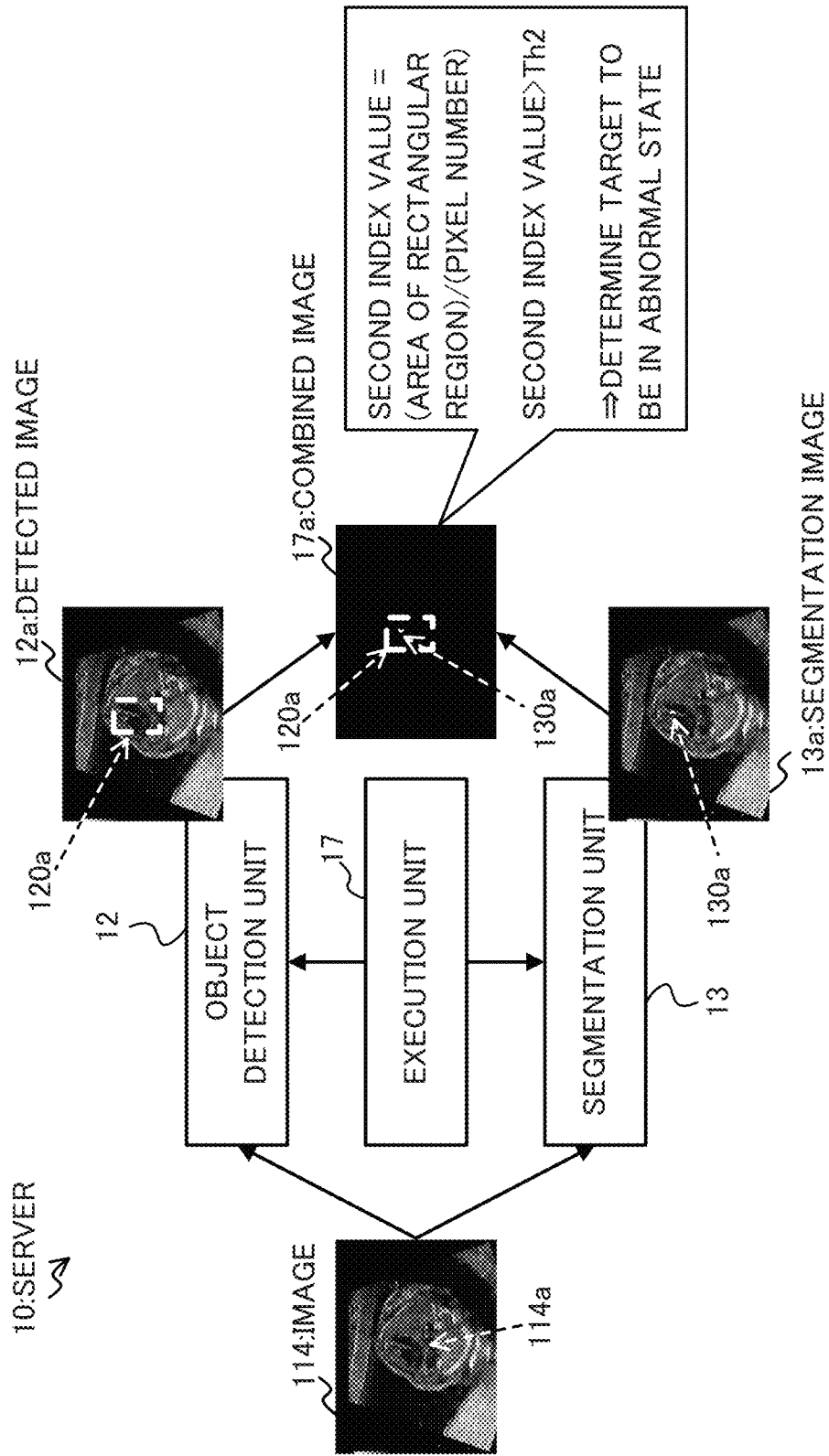
FIG. 16 is a diagram illustrating of an example of an estimation process by the execution unit.

In contrast to the above, the determination unit 18 may determine that the target 114a is in the abnormal state when the calculated second index value is more than the upper-limit threshold Th2 or less than the lower-limit threshold Th1 as illustrated in FIG. 16.

The determination unit 18 can easily determine whether or not the target 114a is in the normal state by comparing the second index value with the threshold Th1 and/or the threshold Th2.

The outputting unit 19 may output (accumulate) the combined images 17a input from the execution unit 17 and/or the detected images 12a and the segmentation images 13a to (into) the memory unit 11 and generate the output-data 11d based on the multiple accumulated images.

Figure 17:
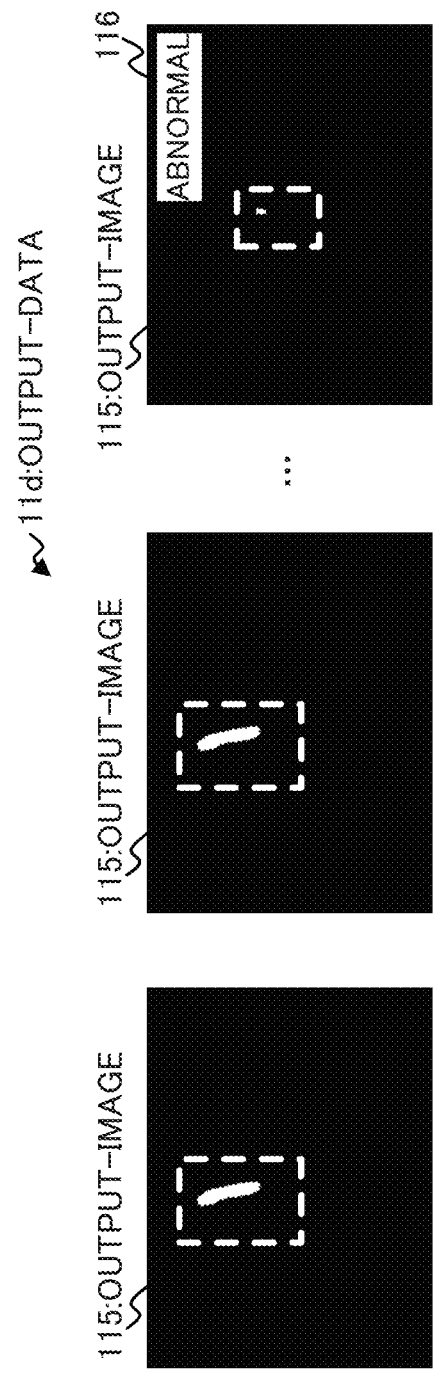
FIG. 17 is a diagram illustrating an example of output-data.

The output-data 11d may be an image set composed of one or more output images 115 each including one of or the both the rectangular region 120a and the pixels 130a. The output image 115 may be the combined image 17a and/or a set of the detected image 12a and the segmentation image 13a, for example. Another example of the output image 115 may be a moving image such as a video image including multiple frames. In one embodiment, the output-data 11d may be a video image in which the output images 115 serving as the combined images 17a are chronologically combined as frames, as illustrated in FIG. 17.

The outputting unit 19 may output the determination result by the determination unit 18 which result is exemplified by whether the target 114a is in the normal state or the abnormal state. The determination result may be displayed in the output image 115 or may be output data independent from the output image 115, for example. In the example of FIG. 17, the outputting unit 19 overlays the display of a message 116 indicating the abnormal state on the output image 115.

The outputting unit 19 may transmit the output-data 11d to a non-illustrated computer, for example.

As described above, the execution unit 17, the determination unit 18, and the outputting unit 19 collectively serve as an example of a determination processing unit that executes a determination process that determines, using the trained estimation model, whether or not the target 114a included in the image 114 is in the normal state. The execution unit 17, the determination unit 18, and the outputting unit 19 collectively serving as an example of a determination processing unit may execute the determination process and output the determination result.

(1-4) Example of Operation

Next, description will now be made in relation to an example of operation of the server 10 having the configuration described above with reference to FIGS. 18 and 19.

(1-4-1) Example of Operation in Training Phase

Figure 18:
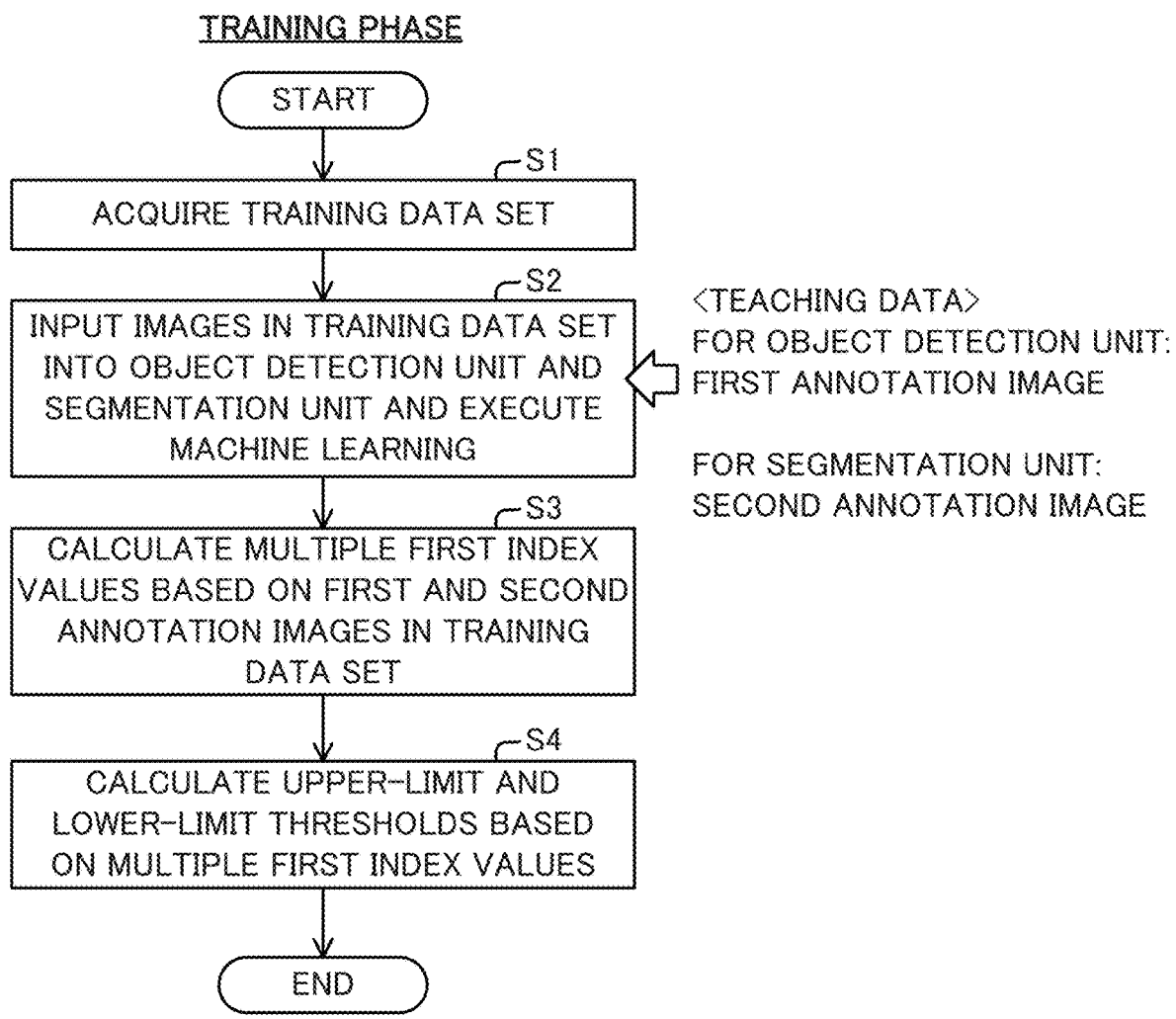
FIG. 18 is a flow diagram illustrating an example of operation in a training phase.

FIG. 18 is a flow diagram illustrating an example of operation performed by the object detection unit 12 and the segmentation unit 13 in a training phase.

As illustrated in FIG. 18, the acquisition unit 14 acquires the training data set 11b (Step S1) and stores the training data set 11b into the memory unit 11.

The training unit 15 inputs an image 111 included in each training data 110 of the training data set 11b into the object detection unit 12 and the segmentation unit 13 and executes machine learning (Step S2). In the machine learning, the training unit 15 gives the first annotation image 112, as teaching data, to the object detection unit 12 and also gives the second annotation image 113, as teaching data, to the segmentation unit 13.

The training unit 15 executes the machine learning on each of the object detection unit 12 and segmentation unit 13, using the multiple training data 110 in the training data set 11b.

Next, the threshold calculating unit 16 calculates multiple first index values based on the first and second annotation images 112 and 113 in the training data set 11b (Step S3).

Then, the threshold calculating unit 16 calculates the lower-limit threshold Th1 and the upper-limit threshold Th2 based on the multiple first index values (step S4) and terminates the process.

(1-4-2) Example of Operation in Determination Phase

Figure 19:
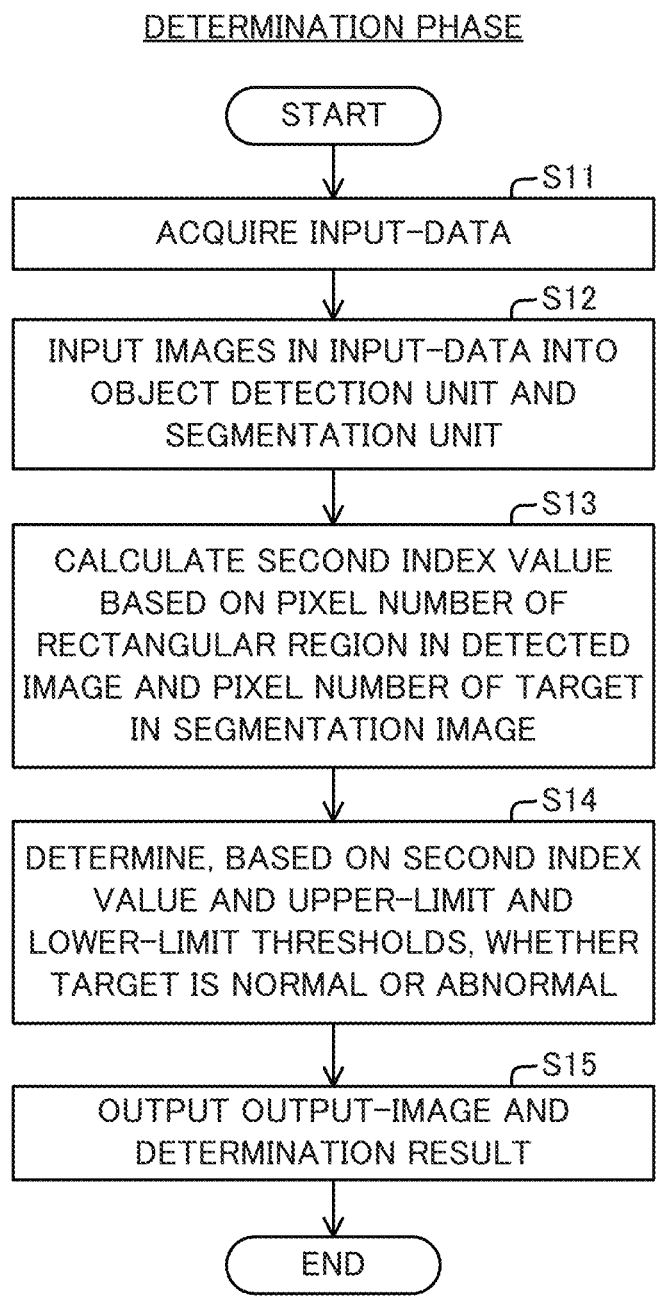
FIG. 19 is a flow diagram illustrating an example of operation in a determination phase.

FIG. 19 is a flow diagram illustrating an example of operation performed by the object detection unit 12 and the segmentation unit 13 in a determination phase.

As illustrated in FIG. 19, the acquisition unit 14 acquires the input-data 11c (Step S11) and stores the input-data 11c into the memory unit 11.

The execution unit 17 inputs an image 114 included in the input-data 11c into the object detection unit 12 and the segmentation unit 13 (Step S12). The execution unit 17 generates a combined image 17a by combining the detected image 12a output from the object detection unit 12 and the segmentation image 13a output from the segmentation unit 13.

The determination unit 18 calculates the second index value based on the pixel number of the rectangular region 120a in the detected image 12a and the pixel number of the pixels 130a corresponding to the target 114a included in the segmentation image 13a (Step S13).

Then the determination unit 18 determines, based on the second index value and the lower-limit threshold Th1 and the upper-limit threshold Th2 that the threshold calculating unit 16 calculates, whether the target 114a is in the normal state or the abnormal state (Step S14).

The outputting unit 19 accumulates the combined images 17a, as the output images 115, and outputs the output-data 11d obtained by merging the output images 115 being accumulated and the determination result made by the determination unit 18 (Step S15), and terminates the process. The output destination of the output-data 11d may be a non-illustrated computer or the like in addition to or in replace of the memory unit 11.

(1-5) Hardware Configuration

FIG. 20 is a block diagram schematically illustrating an example of the HW configuration of a computer 20 that achieves the functions of the information processing apparatus 1 and the sever 10. In cases where multiple computers are used as the HW resource that achieves the functions of the information processing apparatus 1 and the sever 10, each of the computers may have the HW configuration exemplarily illustrated in FIG. 20.

As illustrated in FIG. 20, the computer 20 may exemplarily include a processor 20a, a memory 20b, a storing device 20c, an IF (Interface) device 20d, an I/O (Input/Output) device 20e, and a reader 20f as the HW configuration.

The processor 20a is an example of an arithmetic processing apparatus that performs various controls and arithmetic operations. The processor 20a may be communicably connected to the blocks in the computer 20 to each other via a bus 20i. Alternatively, the processor 20a may be a multi-processor including multiple processors, or a multi-core processor having multiple processor cores, or have a configuration consisting of multiple multi-core processors.

As the processor 20a, integrated circuits (ICs) such as, for example, a CPU, an MPU, a GPU, an APU, a DSP, an ASIC and an FPGA are available. It is to be noted that, as the processor 20a, a combination of two or more of such integrated circuits as mentioned above may be used.

For example, the processing functions of at least part of the information processing apparatus 1, at least some of the acquisition unit 14, the threshold calculating unit 16, and the execution unit 17 of the server 10, the determination unit 18, and the outputting unit 19 may be achieved by a CPU or an MPU serving as the processor 20a. For example, the processing functions of at least part of the information processing apparatus 1, at least some of the object detection unit 12, the segmentation unit 13, and the training unit 15 of the server 10, and the execution unit 17 may be achieved by an accelerator such as a GPU or ASIC (e.g., a Tensor Processing Unit (TPU)) in the processor 20a.

CPU is an abbreviation of Central Processing Unit, and MPU is an abbreviation of Micro Processing Unit. GPU is an abbreviation of Graphics Processing Unit, and APU is an abbreviation of Accelerated Processing Unit. DSP is an abbreviation of Digital Signal Processor, and ASIC is an abbreviation of Application Specific IC and FPGA is an abbreviation of Field-Programmable Gate Array. TPU is an abbreviation of Tensor Processing Unit.

The memory 20b is an example of a HW device that stores information such as various data pieces and a program. An example of the memory 20b includes one of or both a volatile memory such as the Dynamic Random Access Memory (DRAM), and a non-volatile memory such as the Persistent Memory (PM).

The storing device 20c is an example of a HW device that stores various data and a program. Examples of the storing device 20c is various storing devices exemplified by a magnetic disk device such as a Hard Disk Drive (HDD), a semiconductor drive device such as an Solid State Drive (SSD), and a non-volatile memory. Examples of a non-volatile memory are a flash memory, a Storage Class Memory (SCM) and a Read Only Memory (ROM).

The storing device 20c may store a program 20g (information processing program) that achieves all or part of the functions of the computer 20. For example, the processor 20a of the information processing apparatus 1 expands the program 20g stored in the storing device 20c onto the memory 20b and executes the expanded program 20g, so that the function as the information processing apparatus 1 illustrated in FIGS. 4 and 6 can be achieved. Likewise, the processor 20a of the server 10 expands the program 20g stored in the storing device 20c onto the memory 20b and executes the expanded program 20g, so that the function as the server 10 illustrated in FIG. 10 can be achieved.

A storing region possessed by at least one of the memory 20b and the storing device 20c may store the various pieces of the information 11a-11d illustrated in FIG. 10. In other words, the memory unit 11 of FIG. 10 may be achieved by the storing region possessed by at least one of the memory 20b and the storing device 20c.

The IF device 20d is an example of a communication IF that controls connection to and communication with a network. For example, the IF device 20d may include an adaptor compatible with a LAN such as Ethernet (registered trademark) or an optical communication such as Fibre Channel (FC). The adaptor may be compatible with one of or both wired and wireless communication schemes. For example, the server 10 may be communicably connected to another device via the IF device 20d. For example, the program 20g may be downloaded from a network to a computer 20 through the communication IF and then stored into the storing device 20c.

The I/O device 20e may include one of or both an input device and an output device. Examples of the input device are a keyboard, a mouse, and a touch screen. Examples of the output device are a monitor, a projector, and a printer.

The reader 20f is an example of a reader that reads information of data and programs recorded on a recording medium 20h. The reader 20f may include a connecting terminal or a device to which the recording medium 20h can be connected or inserted. Examples of the reader 20f include an adapter conforming to, for example, Universal Serial Bus (USB), a drive apparatus that accesses a recording disk, and a card reader that accesses a flash memory such as an SD card. The program 20g may be stored in the recording medium 20h. The reader 20f may read the program 20g from the recording medium 20h and store the read program 20g into the storing device 20c.

An example of the recording medium 20h is a non-transitory computer-readable recording medium such as a magnetic/optical disk, and a flash memory. Examples of the magnetic/optical disk include a flexible disk, a Compact Disc (CD), a Digital Versatile Disc (DVD), a Blu-ray disk, and a Holographic Versatile Disc (HVD). Examples of the flash memory include a semiconductor memory such as a USB memory and an SD card.

The HW configuration of the computer 20 described above is merely illustrative. Accordingly, the computer 20 may appropriately undergo increase or decrease of HW (e.g., addition or deletion of arbitrary blocks), division, integration in an arbitrary combination, and addition or deletion of the bus. For example, at least one of the I/O device 20e and the reader 20f may be omitted in the information processing apparatus 1 and the sever 10.

(2) MISCELLANEOUS

The technique disclosed in the above one embodiment can be modified or changed as follows.

For example, the processing functions 12-19 that the server 10 of FIG. 10 includes may be merged in an arbitrary combination and each may be divided.

The above one embodiment assumes the target and the image to be an interventricular septum and an echographic image, respectively, but the target and the image are not limited to these examples. The scheme according to the one embodiment can be applied to various targets and images as follows.

Example of the target is a part of a human body and various articles having shapes to be deformed. Examples of the image is various images obtained by photographing a region including the target. Examples of the image include a ultrasonographic image except for an echographic image, a magnetic resonance image, an X-ray image, an image detected by a sensor that captures temperature or electromagnetic image, and an image photographed by an imaging sensor that captures visible light or invisible light.

The server 10 illustrated in FIG. 10 may have a configuration that achieves various processing function by uniting multiple devices via a network. As an example, the acquisition unit 14 and the outputting unit 19 may be one or more Web servers, the object detection unit 12, the segmentation unit 13, the training unit 15, the threshold calculating unit 16, the execution unit 17, and the determination unit 18 may be one or more application servers, and the memory unit 11 may be a Database (DB) server. In this case, each processing function as the server 10 may be achieved by uniting the Web servers, the application servers, and the DB server via a network.

Furthermore, the processing function (i.e., the object detection unit 12, the segmentation unit 13, the acquisition unit 14, and the training unit 15) related to the training process on the object detection unit 12 and the segmentation unit 13, and the processing function (i.e., the execution unit 17, the determination unit 18, and the outputting unit 19) related to the determination process may be provided by different devices. Also in this case, each processing function as the server 10 may be achieved by uniting these devices via a network.

As one aspect, the precision in detecting abnormality of a target can be enhanced.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium having stored therein an information processing program that causes a computer to execute a process comprising:

acquiring a training data set including a plurality of pieces of training data, each of the plurality pieces of training data including an image obtained by photographing a training target, first annotation data representing a rectangular region including the training target in the image, and second annotation data representing one or more pixels corresponding to the training target in the image;

training, based on the image and the first annotation data included in the training data set, an object detection model included in an estimation model, the object detection model specifying a rectangular region including the training target in the image in response to inputting of the image;

training, based on the image and the second annotation data included in the training data set, a neural network included in the estimation model, the neural network outputs one or more pixels estimated to correspond to the training target in the image in response to inputting of the image; and calculating a first index value related to a relationship of a pixel number between a pixel number of the rectangular region including the training target specified by the first annotation data and a pixel number corresponding to the training target specified by the second annotation data, the estimation model after the training and the calculated first index value being used in a determination process that determines, based on the calculated first index value and a second index value, whether or not a target that is to be determined and that is included in a target image is normal, the second index value being related to a relationship between a pixel number corresponding to a rectangular region specified by an estimation result obtained by using the trained object detection model in an output result and a pixel number corresponding to the target specified by an estimation result obtained by using the trained neural network, the output result being output from the estimation model after the training in response to inputting of the target image including the target.

2. The non-transitory computer-readable recording medium according to claim 1, wherein:

the first index value is a ratio between the pixel number corresponding to the rectangular region including the training target specified by the first annotation data and the pixel number corresponding to the training target specified by the second annotation data; and the second index value is a ratio between the pixel number corresponding to the rectangular region specified by the estimation result obtained by using the trained object detection model and the pixel number corresponding to the target specified by the estimation result obtained by using the trained neural network.

3. The non-transitory computer-readable recording medium according to claim 1, the process further comprising:

calculating an average and a variance of a plurality of the first index values calculated based on a plurality of the first annotation data and a plurality of the second annotation data included in the training data set; and determining, based on the calculated average and the calculated variance, one of or both an upper-limit threshold and a lower-limit thresholds of the second index value to determine whether or not the target included in the target image is normal.

4. The non-transitory computer-readable recording medium according to claim 3, the process further comprising, in the determination process, outputting that the target included in the target image is abnormal when the second index value is larger than the upper-limit threshold or is smaller than the lower-limit threshold.

5. The non-transitory computer-readable recording medium according to claim 1, the process further comprising, in the determination process, outputting an image including one of or both the rectangular region specified by the estimation result obtained by using the object detection model and the pixel corresponding to the target specified by the estimation result obtained by using the trained neural network.

6. The non-transitory computer-readable recording medium according to claim 1, wherein a plurality of the image included in the training data set and the target image are ultrasonographic images.

7. A method for processing information executed by a computer, the method comprising:

acquiring a training data set including a plurality of pieces of training data, each of the plurality pieces of training data including an image obtained by photographing a training target, first annotation data representing a rectangular region including the training target in the image, and second annotation data representing one or more pixels corresponding to the training target in the image;

training, based on the image and the first annotation data included in the training data set, an object detection model included in an estimation model, the object detection model specifying a rectangular region including the training target in the image in response to inputting of the image;

training, based on the image and the second annotation data included in the training data set, a neural network included in the estimation model, the neural network outputs one or more pixels estimated to correspond to the training target in the image in response to inputting of the image; and calculating a first index value related to a relationship of a pixel number between a pixel number of the rectangular region including the training target specified by the first annotation data and a pixel number corresponding to the training target specified by the second annotation data, the estimation model after the training and the calculated first index value being used in a determination process that determines, based on the calculated first index value and a second index value, whether or not a target that is to be determined and that is included in a target image is normal, the second index value being related to a relationship between a pixel number corresponding to a rectangular region specified by an estimation result obtained by using the trained object detection model in an output result and a pixel number corresponding to the target specified by an estimation result obtained by using the trained neural network, the output result being output from the estimation model after the training in response to inputting of the target image including the target.

8. The method according to claim 7, wherein:
the first index value is a ratio between the pixel number corresponding to the rectangular region including the training target specified by the first annotation data and the pixel number corresponding to the training target specified by the second annotation data; and
the second index value is a ratio between the pixel number corresponding to the rectangular region specified by the estimation result obtained by using the trained object detection model and the pixel number corresponding to the target specified by the estimation result obtained by using the trained neural network.

9. The method according to claim 7, further comprising:
calculating an average and a variance of a plurality of the first index values calculated based on a plurality of the first annotation data and a plurality of the second annotation data included in the training data set; and
determining, based on the calculated average and the calculated variance, one of or both an upper-limit threshold and a lower-limit thresholds of the second index value to determine whether or not the target included in the target image is normal.

10. The method according to claim 9, further comprising:
in the determination process, outputting that the target included in the target image is abnormal when the second index value is larger than the upper-limit threshold or is smaller than the lower-limit threshold.

11. The method according to claim 7, further comprising:
in the determination process, outputting an image including one of or both the rectangular region specified by the estimation result obtained by using the object detection model and the pixel corresponding to the target specified by the estimation result obtained by using the trained neural network.

12. The method according to claim 7, wherein a plurality of the image included in the training data set and the target image are ultrasonographic images.

13. An information processing apparatus comprising:
a memory; and
a processor coupled to the memory, the processor being configured to:
acquire a training data set including a plurality of pieces of training data, each of the plurality pieces of training data including an image obtained by photographing a training target, first annotation data representing a rectangular region including the training target in the image, and second annotation data representing one or more pixels corresponding to the training target in the image;
train based on the image and the first annotation data included in the training data set, an object detection model included in an estimation model, the object detection model specifying a rectangular region including the training target in the image in response to inputting of the image;
train, based on the image and the second annotation data included in the training data set, a neural network included in the estimation model, the neural network outputs one or more pixels estimated to correspond to the training target in the image in response to inputting of the image;
calculate a first index value related to a relationship of a pixel number between a pixel number of the rectangular region including the training target specified by the first annotation data and a pixel number corresponding to the training target specified by the second annotation data; and
execute a determination process that determines, based on the calculated first index value and a second index value, whether or not a target that is to be determined and that is included in a target image is normal, the second index value being related to a relationship between a pixel number corresponding to a rectangular region specified by an estimation result obtained by using the trained object detection model in an output result and a pixel number corresponding to the target specified by an estimation result obtained by using the trained neural network, using the estimation model after the training and the calculated first index value, the output result being output from the estimation model after the training in response to inputting of the target image including the target.

14. The information processing apparatus according to claim 13, wherein:
the first index value is a ratio between the pixel number corresponding to the rectangular region including the training target specified by the first annotation data and the pixel number corresponding to the training target specified by the second annotation data; and
the second index value is a ratio between the pixel number corresponding to the rectangular region specified by the estimation result obtained by using the trained object detection model and the pixel number corresponding to the target specified by the estimation result obtained by using the trained neural network.

15. The information processing apparatus according to claim 13, the processor being further configured to:
calculate an average and a variance of a plurality of the first index values calculated based on a plurality of the first annotation data and a plurality of the second annotation data included in the training data set; and
determine, based on the calculated average and the calculated variance, one of or both an upper-limit threshold and a lower-limit thresholds of the second index value to determine whether or not the target included in the target image is normal.

16. The information processing apparatus according to claim 15, the processor being further configured to:
in the determination process, output that the target included in the target image is abnormal when the second index value is larger than the upper-limit threshold or is smaller than the lower-limit threshold.

17. The information processing apparatus according to claim 13, the processor being further configured to:
in the determination process, output an image including one of or both the rectangular region specified by the estimation result obtained by using the object detection model and the pixel corresponding to the target specified by the estimation result obtained by using the trained neural network.

18. The information processing apparatus according to claim 13, wherein a plurality of the image included in the training data set and the target image are ultrasonographic images.

* * * * *